US012668002B2

(12) United States Patent (10) Patent No.: US 12,668,002 B2
Schnitzler et al. (45) Date of Patent: Jun. 30, 2026

(54) METHOD OF PRODUCING A COMPONENT FOR A VEHICLE INTERIOR

(71) Applicant: Yanfeng Automotive Safety Systems Co. Ltd, Novi, MI (US)

(72) Inventors: Knut Schnitzler, Neuss (DE); Iris Wegner, Duesseldorf (DE)

(73) Assignee: Yanfeng Automotive Safety Systems Co. Ltd, Novi, MI (US)

( * ) Notice: Subject to any disclaimer, the term of this patent is extended or adjusted under 35 U.S.C. 154(b) by 184 days.

(21) Appl. No.: 18/476,757

(22) Filed: Sep. 28, 2023

(65) Prior Publication Data

US 2024/0025091 A1      Jan. 25, 2024

Related U.S. Application Data

(63) Continuation of application No. PCT/US2022/025433, filed on Apr. 19, 2022.
(Continued)

(51) Int. Cl.
*B29C 44/14* (2006.01)
*B29L 31/30* (2006.01)

(52) U.S. Cl.
CPC ..... *B29C 44/145* (2013.01); *B29L 2031/3026* (2013.01); *B29L 2031/3041* (2013.01)

(58) Field of Classification Search
None
See application file for complete search history.

(56) References Cited

U.S. PATENT DOCUMENTS

| 4,697,064 | A |   | 9/1987 | Altmann et al. |
| 5,056,296 | A | * | 10/1991 | Ross ................. B29C 66/53461 |
|  |  |  |  | 53/329.2 |

(Continued)

FOREIGN PATENT DOCUMENTS

| DE | 10 2004 042440 B3 | 6/2006 |
| DE | 10 154728 B4 | 11/2006 |

(Continued)

OTHER PUBLICATIONS

International Search Report and Written Opinion received for PCT Application Serial No. PCT/US22/25433 dated Sep. 21, 2022, 22 pages.

(Continued)

*Primary Examiner* — Abbas Rashid
*Assistant Examiner* — Elisa H Vera
(74) *Attorney, Agent, or Firm* — Amin, Turocy & Watson, LLP

(57) ABSTRACT

A method of producing a component for a vehicle interior may comprise placing a liner in a forming tool, placing a heater element on the liner, applying a foam material, and forming the heater element on a substrate. Adhesive may be applied to the heater element and liner. The liner may comprise a tool liner configured to facilitate removal of the component from the forming tool. The tool liner may remain in the forming tool when the component is removed from the forming tool. The tool liner may be re-usable. The adhesive/ tape may comprise a pressure-sensitive adhesive with suitable adhesion for the heater element/mat without requiring activation; the adhesive/tape may comprise a side with lower adhesion to the mold liner (temporary adhesion) and with higher adhesion to the body of the heater element/mat (permanent adhesion). A pre-fix tool may be used.

20 Claims, 28 Drawing Sheets

Related U.S. Application Data

(60) Provisional application No. 63/177,259, filed on Apr. 20, 2021.

(56) References Cited

U.S. PATENT DOCUMENTS

| | | | |
|---|---|---|---|
| 5,137,672 A * | 8/1992 | Fujiu | B29C 48/395 264/130 |
| 6,054,690 A | 4/2000 | Petit et al. | |
| 6,792,671 B1 | 9/2004 | Oberg | |
| 6,969,827 B2 | 11/2005 | Yoneyama et al. | |
| 7,977,608 B2 | 7/2011 | Diemer et al. | |
| 8,641,139 B2 | 2/2014 | Gerken et al. | |
| 8,884,191 B2 | 11/2014 | Ogino et al. | |
| 8,894,125 B2 | 11/2014 | Johannboeke et al. | |
| 8,952,296 B2 | 2/2015 | Hermann et al. | |
| 9,744,830 B2 | 8/2017 | Oh et al. | |
| 9,884,537 B2 | 2/2018 | Satzger et al. | |
| 9,931,796 B2 | 4/2018 | Thalhammer | |
| 10,201,039 B2 | 2/2019 | Barfuss et al. | |
| 10,352,295 B2 | 7/2019 | Eichler | |
| 10,800,299 B2 | 10/2020 | Feineis et al. | |
| 10,960,731 B2 | 3/2021 | Lochmann et al. | |
| 10,974,663 B2 | 4/2021 | Cannon | |
| 2001/0030182 A1 | 10/2001 | Haag et al. | |
| 2002/0170902 A1 | 11/2002 | Check et al. | |
| 2004/0069762 A1 | 4/2004 | Yoneyama et al. | |
| 2007/0056957 A1 | 3/2007 | Diemer et al. | |
| 2007/0186404 A1 * | 8/2007 | Drew | B23Q 3/086 29/559 |
| 2008/0036110 A1 * | 2/2008 | Brooker | B29C 44/351 425/388 |
| 2011/0250375 A1 | 10/2011 | Bries et al. | |
| 2012/0234819 A1 | 9/2012 | Berger | |

| | | | |
|---|---|---|---|
| 2019/0126853 A1 | 5/2019 | Cannon | |
| 2019/0135077 A1 | 5/2019 | Lee et al. | |
| 2019/0283689 A1 | 9/2019 | Bock et al. | |
| 2019/0344691 A1 * | 11/2019 | Liau | B29C 43/003 |
| 2021/0086670 A1 | 3/2021 | Kozlowski et al. | |
| 2021/0291627 A1 | 9/2021 | Wehninck | |
| 2021/0370556 A1 | 12/2021 | Klusmeier et al. | |
| 2022/0097580 A1 | 3/2022 | Gupta et al. | |
| 2022/0407214 A1 | 12/2022 | Bouabdalli et al. | |

FOREIGN PATENT DOCUMENTS

| | | |
|---|---|---|
| DE | 10 2004 044315 B4 | 12/2008 |
| DE | 10 159814 B4 | 6/2011 |
| DE | 10 2011 121574 A1 | 6/2013 |
| DE | 10 2012 021866 A1 | 10/2013 |
| DE | 10 2013 008488 A1 | 11/2014 |
| DE | 10 2013 009930 A1 | 12/2014 |
| DE | 10 2015 200272 A1 | 7/2016 |
| DE | 10 2012 021887 B4 | 1/2018 |
| EP | 0 674 488 B1 | 9/1998 |
| EP | 1190828 A1 | 3/2002 |
| EP | 1 138 470 B1 | 5/2004 |
| EP | 1 528 837 B1 | 12/2007 |
| WO | 2007/118498 A1 | 10/2007 |
| WO | 2018/184614 A1 | 10/2018 |
| WO | 2020/172379 A1 | 8/2020 |

OTHER PUBLICATIONS

Extended European Search Report received for European Patent Application Serial No. 22792355.4 dated Jan. 28, 2025, 7 pages.
Office Action received for European Patent Application Serial No. 22792355.4 dated Feb. 13, 2026, 4 pages.

* cited by examiner

MC

AR/C

T

HM

FM

START

PROVIDE HEATER MAT
WITH DOUBLE SIDED
ADHESIVE TAPE

PLACE ADHESIVE SIDE
OF HEATER MAT IN LINER
OF MOLD SECTION

PLACE BASE
IN MOLD SECTION

INJECT FOAM
MATERIAL ON
HEATER MAT AND
CLOSE MOLD

FORM COMPONENT

DEMOLD
FORMED COMPONENT

END

START

PROVIDE HEATER MAT WITH DOUBLE SIDED ADHESIVE TAPE

PLACE ADHESIVE SIDE OF HEATER MAT IN LINER OF TOP MOLD SECTION

PLACE BASE IN UPPER MOLD SECTION

INJECT FOAM MATERIAL ON HEATER MAT AND CLOSE MOLD

FORM COMPONENT

DEMOLD FORMED COMPONENT

END

START

PROVIDE HEATER MAT
WITH DOUBLE SIDED
ADHESIVE TAPE

PLACE ADHESIVE SIDE
OF HEATER MAT IN LINER
OF MOLD SECTION

PLACE BASE
IN MOLD SECTION

INJECT FOAM AND
CLOSE MOLD TO
FORM COMPONENT

DEMOLD
FORMED COMPONENT

APPLY COVER LAYER
ON FORMED
COMPONENT

END

METHOD OF PRODUCING A COMPONENT FOR A VEHICLE INTERIOR

CROSS-REFERENCE TO RELATED APPLICATIONS

The present application is a continuation of PCT/International Patent Application No. PCT/US22/25433 titled "METHOD OF PRODUCING A COMPONENT FOR A VEHICLE INTERIOR" filed Apr. 19, 2022, which claims the benefit of U.S. Provisional Patent Application No. 63/177,259 titled "VEHICLE INTERIOR COMPONENT" filed Apr. 20, 2021.

The present application claims priority to and incorporates by reference in full the following patent applications: (a) U.S. Provisional Patent Application No. 63/177,259 titled "VEHICLE INTERIOR COMPONENT" filed Apr. 20, 2021; (b) PCT/International Patent Application No. PCT/US22/25433 titled "METHOD OF PRODUCING A COMPONENT FOR A VEHICLE INTERIOR" filed Apr. 19, 2022.

FIELD

The present invention relates to a method of producing a component for a vehicle interior.

The present invention also relates to a component for a vehicle interior.

BACKGROUND

It is known to produce a component for a vehicle interior comprising a heating element to provide enhanced comfort to occupants of the vehicle interior.

It would be advantageous to provide an improved method of producing a component for a vehicle interior.

It would also be advantageous to provide an improved method of forming a formed component for a component for a vehicle interior.

It would also be advantageous to provide an improved method of forming a formed component comprising a heater element for a component for a vehicle interior.

It would also be advantageous to provide an improved method of forming a formed component comprising a heater element for a component for a vehicle interior in a tool using a tool liner.

It would also be advantageous to provide an improved component comprising a heater element for a component for a vehicle interior.

It would also be advantageous to provide an improved formed component comprising a heater element with adhesive material for a component for a vehicle interior.

It would also be advantageous to provide an improved formed component comprising a heater element with two-sided adhesive material/tape for a component for a vehicle interior.

It would also be advantageous to provide an improved formed component comprising a heater element on a foam material (to provide softness for the resting arm/elbow) for a component for a vehicle interior.

SUMMARY

The present invention relates to a method of producing in a forming tool a component for a vehicle interior comprising a heater element on a substrate comprising the steps of preparing the heater element, placing a liner in the forming tool, placing the heater element on the liner, applying a foam material, and applying the heater element on the substrate. The step of preparing the heater element may comprise the step of applying an adhesive to the heater element. The step of applying adhesive to the heater element may comprise forming temporary adhesion between the heater element and the liner. The liner may comprise a tool liner configured to facilitate removal of the component from the forming tool. The step of applying adhesive to the heater element may comprise forming temporary adhesion between the heater element and the tool liner so that the tool liner remains in the forming tool when the component is removed from the forming tool. The tool liner may be re-usable. The adhesive may comprise an adhesive web. The step of applying a foam material may comprise injecting a foam material on the adhesive web; the foam material may flow into a set of pores in the adhesive web. The heater element may comprise a first side and a second side; the step of applying adhesive to the heater element may comprise applying a first adhesive to the first side; the first side of the heater element may be attached by the first adhesive to the liner and the second side of the heater element may be attached without adhesive to the foam material. The first adhesive may comprise a first peel adhesion. A second adhesive for the heater element may comprise a peel adhesion higher than the first peel adhesion. The forming tool may comprise a first section and a second section; the step of placing the liner in the forming tool may comprise placing the liner in the first section of the forming tool; the second section of the forming tool may be configured for the substrate. The substrate may comprise a formed substrate providing a shape for the component; the step of applying the heater element on the substrate may comprise forming a formed component with the shape. The liner may comprise a removable liner remaining in the forming tool when the formed element is removed from the forming tool. The removable liner may comprise a chemically inert surface; the removable liner may comprise at least one of a polyethylene material or a silicone material. The step of applying the heater element on the substrate may comprise forming a formed component. The method may comprise the step of removing the formed component from the forming tool. The method may comprise the step of applying a glue layer on the heater element. The method may comprise the step of applying a cover layer on the glue layer of the formed component. The cover layer may comprise at least one of (a) foil; (b) foam foil; (c) leather; (d) artificial leather; (e) TPO; (f) TPE; (g) PVC; (h) TPU; (i) compact foil; (j) bilaminate foil; (k) film layer; (l) foil layer; (m) fabric; (n) spacer fabric. A wire arrangement of the heater element may be physically imperceptible at the cover layer; the heater element may be visually imperceptible at the cover layer.

The present invention relates to a method of producing a component for a vehicle interior comprising a heater element on a substrate comprising the steps of heating a pre-fixing mold, placing the liner in the pre-fixing mold, placing the heater element on the liner in the pre-fixing mold, heating the liner and heater element in the pre-fixing mold, transferring the liner and heater element to a forming tool, applying a foam material to the heater element, forming the heater element on the substrate as a formed component, and removing the formed component from the forming tool. The liner may comprise a removable liner remaining in the forming tool when the formed element is removed from the forming tool. The method may comprise the steps of preparing the heater element by applying adhesive to the heater element and adhering the heater element towards the liner by at least one of (a) heat activation; (b) heating the pre-fixing tool; (c) pressure activation; (d) applying a force to press the heater element towards the liner in the pre-fixing mold.

The present invention relates to a method of producing a component for a vehicle interior comprising a heater element on a substrate comprising the steps of providing a heater element with a liner and an adhesive, heating a pre-fixing mold, placing the heater element with the liner and the adhesive in the pre-fixing mold, heating the heater element with liner and the adhesive in the pre-fixing mold, transferring the heater element with liner and adhesive to a forming tool, applying a foam material, and forming the heater element on the substrate. The heater element may comprise a heater mat. The step of preparing the heater element may comprise the step of applying adhesive to the heater element.

The present invention relates to a method of producing in a forming tool a component for a vehicle interior comprising a heater element on a substrate comprising the steps of preparing the heater element, placing a liner in the forming tool, placing the heater element on the liner, applying a foam material, and applying the heater element on the substrate. The step of preparing the heater element may comprise the step of applying an adhesive to the heater element. The method may comprise the step of forming a formed component of the substrate with the liner and the foam material. Applying the heater element on the substrate may comprise forming the heater element on the substrate. The method may comprise the step of applying adhesive such as a two-sided adhesive/tape to one side of the heater element. The step of applying adhesive to the heater element may comprise forming temporary adhesion between the heater element and the liner. The liner may comprise a tool liner configured to facilitate removal of the component from the forming tool. The step of applying adhesive to the heater element may comprise forming temporary adhesion between the heater element and the tool liner so that the tool liner remains in the forming tool when the component is removed from the forming tool. The tool liner may be re-usable. The adhesive may comprise a pressure-sensitive adhesive. The adhesive may comprise an adhesive layer with a plastic film. The adhesive may comprise a thermally-activated adhesive. The adhesive may comprise an adhesive web. The adhesive web may comprise a polyurethane-based web. The step of applying a foam material may comprise injecting a foam material on the adhesive web. The foam material may flow into a set of pores in the adhesive web. The adhesive may comprise a dry adhesive. The adhesive may comprise a dry adhesive with a peel-off layer. The adhesive may comprise a carrier with a dry adhesive with a peel-off layer. The method may comprise the step of providing a carrier providing the adhesive. The carrier may comprise at least one of (a) a fabric carrier; (b) a non-woven material. The carrier may comprise at least one of (a) plastic material; (b) a film carrier; (c) a plastic film carrier. The carrier may comprise a film carrier with a dry adhesive with a peel-off layer. The adhesive may comprise a carrier with dry adhesive applied from a wound roll. The carrier with dry adhesive may comprise a peel-off layer. The step of applying adhesive to the heater element may comprise applying a double-sided adhesive tape. The step of applying adhesive to the heater element may comprise applying adhesive to two sides of the heater element. The adhesive may comprise at least one of (a) a pressure-sensitive adhesive; (b) a thermally-activated adhesive; (c) an adhesive web; (d) a dry adhesive; (e) a double-sided adhesive tape; (f) polymer from the group of polyurethanes, acrylics, ethylene-vinyl acetates or their copolymers. The heater element may comprise a first side and a second side; the step of applying adhesive to the heater element may comprise applying a first adhesive to the first side. The first side of the heater element may be attached by the first adhesive to the liner and the second side of the heater element may be attached without adhesive to the foam material. The first adhesive may comprise a first peel adhesion. The second adhesive for the heater element may comprise a peel adhesion higher than the first peel adhesion. The first side of the heater element may be attached to the liner and the second side of the heater element may be attached to the foam material. The first adhesive may comprise a tape. The second adhesive for the heater element may comprise at least one of a tape and/or a carrier and/or a pressure-activated adhesive and/or a thermally-activated adhesive. The step of applying a foam material may comprise at least one of (a) applying a foam material on the substrate; (b) applying a foam material on the heater element. The forming tool may comprise a first section and a second section; the step of placing the liner in the forming tool may comprise placing the liner in the first section of the forming tool; the second section of the forming tool may be configured for the substrate. The heater element may comprise at least one of (a) a heater mat; (b) a heater mat assembly; (c) heater wires on a mat; (d) an electrical connector and a sensor. The substrate may comprise a formed substrate providing a shape for the component; the step of applying the heater element on the substrate may comprise forming a formed component with the shape. The liner may comprise a removable liner remaining in the forming tool when the formed element is removed from the forming tool. The removable liner may comprise a chemically inert surface. The removable liner may comprise at least one of a polyethylene material or a silicone material. The step of applying the heater element on the substrate may comprise forming a formed component; the method may comprise the step of removing the formed component from the forming tool; the method may comprise the step of applying a glue layer on the heater element; the method may comprise the step of applying a cover layer on the glue layer of the formed component. The cover layer may comprise at least one of (a) foil; (b) foam foil; (c) leather; (d) artificial leather; (e) TPO; (f) TPE; (g) PVC; (h) TPU; (i) compact foil; (j) bilaminate foil; (k) film layer; (l) foil layer; (m) fabric; (n) spacer fabric. A wire arrangement of the heater element may be physically imperceptible at the cover layer. The heater element may be visually imperceptible at the cover layer. The method may comprise the step of applying the heater element with the substrate into a formed component. The method may comprise the step of forming a formed component comprising the heater element with the substrate. The method may comprise the step of forming a formed component comprising the heater element with the substrate and the foam material.

The present invention relates to a component for a vehicle interior comprising a substrate, a foam material on the substrate, a heater element on the foam material, and a cover layer over the heater element. The heater element may be attached to the foam material by an adhesive. The adhesive may comprise at least one of (a) a pressure-sensitive adhesive; (b) a thermally-activated adhesive; (c) an adhesive web; (d) a dry adhesive; (e) a double-sided adhesive tape; (f) polymer from the group of polyurethanes, acrylics, ethylene-vinyl acetates or their copolymers. The adhesive may be intermingled with the foam material. The adhesive may comprise at least two adhesive layers separated by a carrier. The adhesive may comprise an adhesive layer with a plastic film. The adhesive may comprise at least one of (a) an adhesive web; (b) a polyurethane-based web. The adhesive may comprise an adhesive web comprising a set of pores; the foam material may be at least one of (a) within the set of pores in the adhesive web; (b) fused into the set of pores in the adhesive web. The adhesive may comprise an adhesive web; the foam material may be on the adhesive web. The component may comprise a carrier providing the adhesive. The carrier may comprise at least one of (a) a fabric carrier; (b) a non-woven material. The carrier may comprise at least one of (a) a plastic material; (b) a film carrier; (c) a plastic film carrier. A wire arrangement of the heater element may be physically imperceptible at the cover layer. The heater element may be visually imperceptible at the cover layer. The component may comprise a glue layer for the cover layer.

The present invention relates to a method of producing a component for a vehicle interior comprising a heater element on a substrate comprising the steps of heating a pre-fixing mold, placing the liner in the pre-fixing mold, placing the heater element on the liner in the pre-fixing mold, heating the liner and heater element in the pre-fixing mold, transferring the liner and heater element to a forming tool, applying a foam material to the heater element, forming the heater element on the substrate as a formed component, and removing the formed component from the forming tool. The liner may comprise a removable liner remaining in the forming tool when the formed element is removed from the forming tool. The method may comprise the step of preparing the heater element by applying adhesive to the heater element. The method may comprise the step of adhering the heater element towards the liner by at least one of (a) heat activation; (b) heating the pre-fixing tool; (c) pressure activation; (d) applying a force to press the heater element towards the liner in the pre-fixing mold.

The present invention relates to a method of producing a component for a vehicle interior comprising a heater element on a substrate comprising the steps of providing a heater element with a liner and an adhesive, heating a pre-fixing mold, placing the heater element with the liner and the adhesive in the pre-fixing mold, heating the heater element with liner and the adhesive in the pre-fixing mold, transferring the heater element with liner and adhesive to a forming tool, applying a foam material, and forming the heater element on the substrate. The heater element may comprise a heater mat. The step of preparing the heater element may comprise the step of applying adhesive to the heater element. The method may comprise the step of preparing the heater element by applying adhesive to the heater element. The liner may comprise a removable liner remaining in the forming tool when the formed element is removed from the forming tool. The step of applying a foam material may comprise injecting a foam material on the heater element.

The present invention relates to a component for a vehicle interior comprising a heater element on a substrate formed by a method comprising the steps of applying an adhesive to the heater element, placing a liner in a forming tool, placing the heater element with the adhesive on the liner, applying a foam material, and forming the heater element on the substrate. The adhesive may comprise at least one of (a) a pressure-sensitive adhesive; (b) a thermally-activated adhesive; (c) an adhesive web; (d) a dry adhesive; (e) a double-sided adhesive tape; (f) polymer from the group of polyurethanes, acrylics, ethylene-vinyl acetates or their copolymers. The method may comprise the steps of applying a glue layer on the heater element and applying a cover layer on the glue layer.

The present invention relates to a method of producing in a forming tool a component for a vehicle interior comprising a heater element on a substrate comprising the steps of preparing the heater element, placing a liner in the forming tool, placing the heater element on the liner, applying a foam material, and forming the heater element on the substrate. The step of preparing the heater element may comprise the step of applying adhesive to the heater element. The method may comprise the step of applying adhesive such as a two-sided adhesive/tape to one side of the heater element. The method may comprise the step of removing the component from the forming tool. The step of applying adhesive to the heater element may comprise forming temporary adhesion between the heater element and the liner. The liner may comprise a tool liner configured to facilitate removal of the component from the forming tool. The step of applying adhesive to the heater element may comprise forming temporary adhesion between the heater element and the tool liner so that the tool liner remains in the forming tool when the component is removed from the forming tool. The tool liner may be re-usable. The adhesive may comprise a pressure-sensitive adhesive. The adhesive may comprise an adhesive layer with a plastic film. The adhesive may comprise a thermally-activated adhesive. The thermally-activated adhesive may comprise an adhesive web. The adhesive may comprise an adhesive web. The adhesive web may comprise a polyurethane-based web. The adhesive web may comprise a set of pores. The step of applying a foam material may comprise injecting a foam material on the adhesive web. The foam material may flow into a set of pores in the adhesive web. The adhesive may comprise a dry adhesive. The adhesive may comprise a dry adhesive with a peel-off layer. The adhesive may comprise a carrier with a dry adhesive with a peel-off layer. The method may comprise providing a carrier providing the adhesive. The carrier may comprise a fabric carrier. The carrier may comprise a non-woven material. The carrier may comprise a plastic material. The carrier may comprise a film carrier. The carrier may comprise a plastic film carrier. The carrier may comprise a film carrier with a dry adhesive with peel-off layer. The adhesive may comprise a carrier with dry adhesive applied from a wound roll. The carrier with dry adhesive may comprise a peel-off layer. The step of applying adhesive to the heater element may comprise applying a double-sided adhesive tape. The step of applying adhesive to the heater element may comprise applying adhesive to each side of the heater element. The heater element may comprise a first side and a second side; the step of applying adhesive to the heater element may comprise applying a first adhesive to the first side. The first side of the heater element may be attached by the first adhesive to the liner and the second side of the heater element may be attached without adhesive to the foam material. The first adhesive may comprise a first peel adhesion. The second adhesive for the heater element may comprise a peel adhesion higher than the first peel adhesion. The first peel adhesion may be a lower peel adhesion. The second peel adhesion may be a higher peel adhesion. The first side of the heater element may be attached to the liner and the second side of the heater element may be attached to the foam material. The first adhesive may comprise a tape. The second adhesive for the heater element may comprise at least one of a tape and/or a carrier and/or a pressure-activated adhesive and/or a thermally-activated adhesive. The step of applying a foam material may comprise applying a foam material on the substrate. The step of applying a foam material may comprise applying a foam material on the heater element. The step of applying a foam material may comprise applying a foam material on a carrier for the adhesive. The forming tool may comprise a first second and a second section. The step of placing the liner in the forming tool may comprise placing the liner in the first section of the forming tool. The second section of the forming tool may be configured for the substrate. The substrate may comprise a pre-formed substrate. The heater element may comprise a heater mat. The heater element may comprise a heater mat assembly. The heater mat assembly may comprise heater wires on a mat. The heater mat assembly may comprise an electrical connector for the heater wires and a sensor (such as a thermal sensor or other instrumentation/data acquisition device). The heater mat assembly may comprise a removable layer. The removable layer may comprise a peel-away paper. The substrate may comprise a formed substrate providing a shape for the component. The step of forming the heater element on the substrate may comprise forming a formed component with the shape. The step of forming the heater element on the substrate may comprise forming a formed component by closing the forming tool to provide a shape. The step of applying a foam material may comprise injecting a foam material on the heater element. The method may comprise the step of removing the formed component from the forming tool. The liner may comprise a removable liner remaining in the forming tool when the formed element is removed from the forming tool. The removable liner may comprise a chemically inert surface. The removable liner may comprise at least one of a polyethylene material or a silicone material. The liner may comprise a mold liner. The step of forming the heater element on the substrate may comprise forming a formed component. The method may comprise the step of applying a cover layer to the formed component. The step of forming the heater element on the substrate may comprise forming a formed component. The method may comprise the step of removing the formed component from the forming tool; further comprising the step of applying a cover layer to the formed component. The step of forming the heater element on the substrate may comprise forming a formed component. The method may comprise the step of removing the formed component from the forming tool. The method may comprise the step of applying a glue layer on the heater element. The method may comprise the step of applying a cover layer on the glue layer of the formed component. The formed component with the cover layer may comprise an armrest assembly with a heater element. The cover layer may comprise at least one of (a) foil; (b) foam foil; (c) leather; (d) artificial leather; (e) TPO; (f) TPE; (g) PVC; (h) TPU; (i) compact foil; (j) bilaminate foil; (k) film layer; (l) foil layer; (m) fabric; (n) spacer fabric. A wire arrangement of the heater element may be physically imperceptible at the cover layer. The heater element may be visually imperceptible at the cover layer. A wire arrangement of the heater element may be physically imperceptible within the component. The heater element may be visually imperceptible within the component. The method may comprise the step of forming the heater element with the substrate into a formed component. The method may comprise the step of forming a formed component comprising the heater element with the substrate. The method may comprise the step of forming a formed component comprising the heater element with the substrate and the foam material. The forming tool may comprise a first section and a second section coupled to the first section by a hinge. The step of forming the formed component may comprise closing the first section onto the second section.

The present invention relates to a method of producing in a forming tool a component for a vehicle interior comprising a heater element on a substrate comprising the steps of preparing the heater element, placing the substrate in a first section of the forming tool, placing a liner in a second section of the forming tool, applying a foam material on the liner, forming a formed component of the substrate with liner and foam material, and applying the heater element to the formed component. The step of preparing the heater element may comprise applying adhesive to the heater element. The heater element may comprise a heater mat assembly. The adhesive may comprise at least one of (a) a pressure-sensitive adhesive; (b) a thermally-activated adhesive; (c) an adhesive web; (d) a dry adhesive; (e) a double-sided adhesive tape; (f) polymer from the group of polyurethanes, acrylics, ethylene-vinyl acetates or their copolymers. The method may comprise the step of applying a cover layer to the formed component.

The present invention relates to a component for a vehicle interior comprising a substrate, a foam material on the substrate, a heater element on the foam material, and a cover layer over the heater element. The heater element may be attached to the foam material by an adhesive. The component may comprise a composite structure comprising the heater element and the adhesive. The component may comprise a composite structure comprising the heater element and the adhesive and the foam material. The adhesive may comprise at least one of (a) a pressure-sensitive adhesive; (b) a thermally-activated adhesive; (c) an adhesive web; (d) a dry adhesive; (e) a double-sided adhesive tape; (f) polymer from the group of polyurethanes, acrylics, ethylene-vinyl acetates or their copolymers. The adhesive may be intermingled with the foam material. The adhesive may comprise at least two adhesive layers. The adhesive may comprise at least two adhesive layers separated by a carrier. The adhesive may comprise a pressure-sensitive adhesive. The adhesive may comprise an adhesive layer with a plastic film. The adhesive may comprise a thermally-activated adhesive. The thermally-activated adhesive may comprise an adhesive web. The adhesive may comprise an adhesive web. The adhesive web may comprise a polyurethane-based web. The adhesive web may comprise a set of pores. The foam material may be on the adhesive web. The foam material may be within a set of pores in the adhesive web. The foam material may be fused into a set of pores in the adhesive web. The adhesive may comprise a dry adhesive. The component may comprise a carrier providing the adhesive. The carrier may comprise a fabric carrier. The carrier may comprise a non-woven material. The carrier may comprise a plastic material. The carrier may comprise a film carrier. The carrier may comprise a plastic film carrier. The cover layer may comprise at least one of (a) foil; (b) foam foil; (c) leather; (d) artificial leather; (e) TPO; (f) TPE; (g) PVC; (h) TPU; (i) compact foil; (j) bilaminate foil; (k) film layer; (l) foil layer; (m) fabric; (n) spacer fabric. A wire arrangement of the heater element may be physically imperceptible. The heater element may be visually imperceptible. A wire arrangement of the heater element may be physically imperceptible at the cover layer. The heater element may be visually imperceptible at the cover layer. The component may comprise a glue layer for the cover layer. The heater element may comprise a heater mat assembly. The component may comprise an armrest assembly.

The present invention relates to a component for a vehicle interior comprising a heater element on a substrate formed by a method comprising the steps of preparing the heater element, placing a liner in the forming tool, placing the heater element on the liner, applying a foam material, and forming the heater element on the substrate. The step of preparing the heater element may comprise the step of applying adhesive to the heater element. The adhesive may comprise at least one of (a) a pressure-sensitive adhesive; (b) a thermally-activated adhesive; (c) an adhesive web; (d) a dry adhesive; (e) a double-sided adhesive tape; (f) polymer from the group of polyurethanes, acrylics, ethylene-vinyl acetates or their copolymers. The step of forming the heater element on the substrate may comprise forming a formed component. The step of forming the heater element on the substrate may comprise forming a formed component having a shape. The method may comprise the step of removing the formed component from the forming tool. The method may comprise the step of applying a glue layer on the heater element of the formed component. The method may comprise the step of applying a cover layer on the glue layer of the formed component. The component may comprise an armrest assembly.

The present invention relates to a method of producing a component for a vehicle interior comprising a heater element on a substrate comprising the steps of heating a pre-fixing mold, placing the liner in the pre-fixing mold, placing the heater element on the liner in the pre-fixing mold, heating the liner and heater element in the pre-fixing mold, transferring the liner and heater element to a forming mold, applying a foam material to the heater element, forming the heater element on the substrate as a formed component, and removing the formed component from the forming tool. The liner may comprise a removable liner remaining in the forming tool when the formed element is removed from the forming tool. The method may comprise the step of preparing the heater element by applying adhesive to the heater element. The method may comprise the step of adhering the heater element towards the liner by heat activation. The method may comprise the step of adhering the heater element towards the liner by heat activation by heating the pre-fixing tool. The method may comprise the step of adhering the heater element towards liner by pressure activation. The method may comprise the step of adhering the heater element towards liner by pressure activation by applying a force to press heater element towards the liner in the pre-fixing tool.

The present invention relates to a method of producing a component for a vehicle interior comprising a heater element on a substrate comprising the steps of providing a heater element with a liner and an adhesive, heating a pre-fixing mold, placing the heater element with the liner and the adhesive in the pre-fixing mold, heating the heater element with liner and the adhesive in the pre-fixing mold, transferring the heater element with liner and adhesive to a forming mold, applying a foam material, and forming the heater element on the substrate. The heater element may comprise a heater mat. The step of preparing the heater element may comprise the step of applying adhesive to the heater element. The method may comprise the step of preparing the heater element by applying adhesive to the heater element. The step of forming the heater element on the substrate may comprise forming a formed component. The method may comprise the step of removing the formed component from the forming tool. The liner may comprise a removable liner remaining in the forming tool when the formed element is removed from the forming tool. The step of applying a foam material may comprise injecting a form material on the heater element.

FIGURES

DESCRIPTION

Figures 1A, 1B, 2:
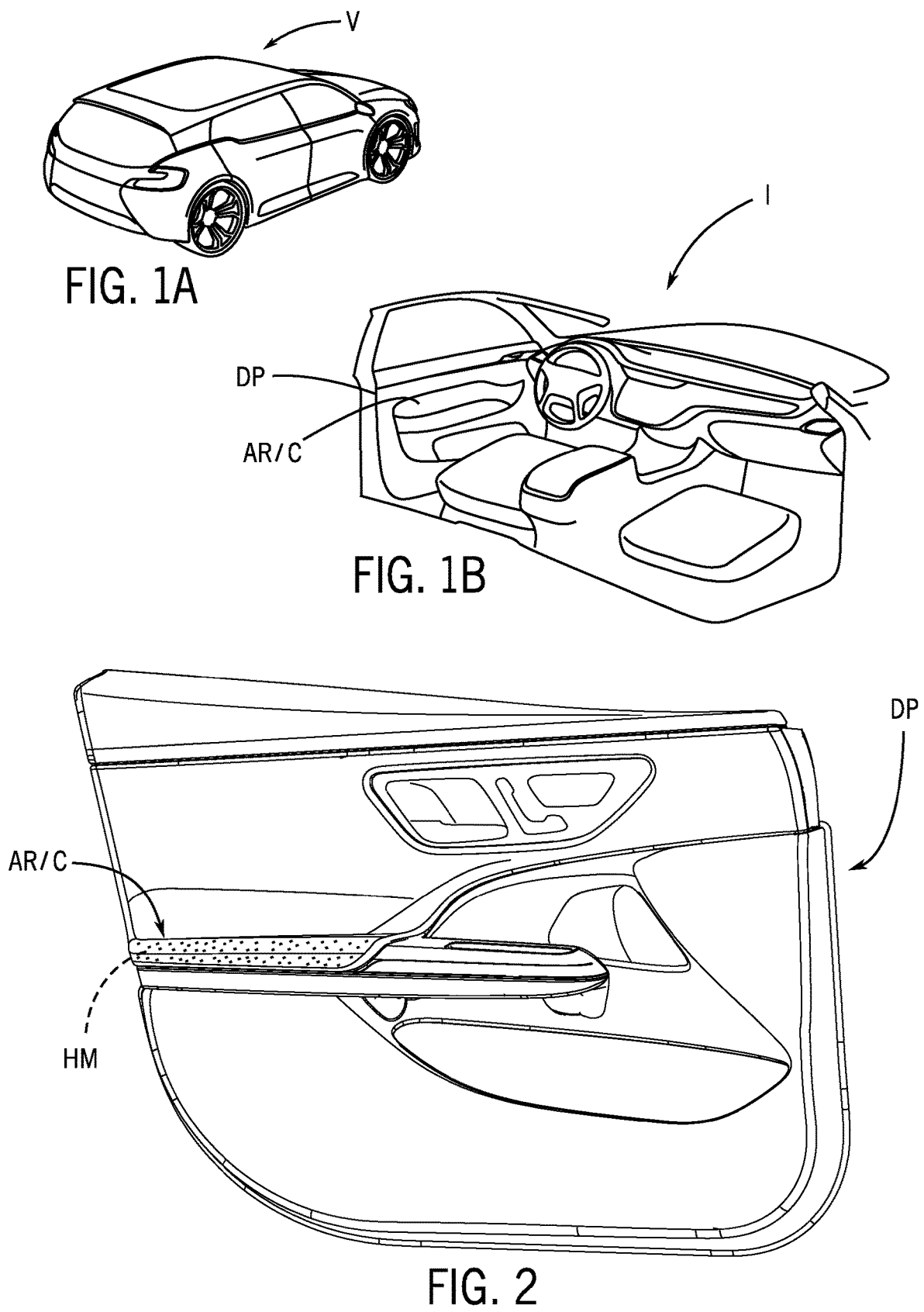
FIG. 1A is a schematic perspective view of a vehicle according to an exemplary embodiment.
FIG. 1B is a schematic perspective cut-away view of a vehicle showing a vehicle interior according to an exemplary embodiment.
FIG. 2 is a schematic front view of a component for a vehicle interior according to an exemplary embodiment.
Figures 3A, 3B, 3C:
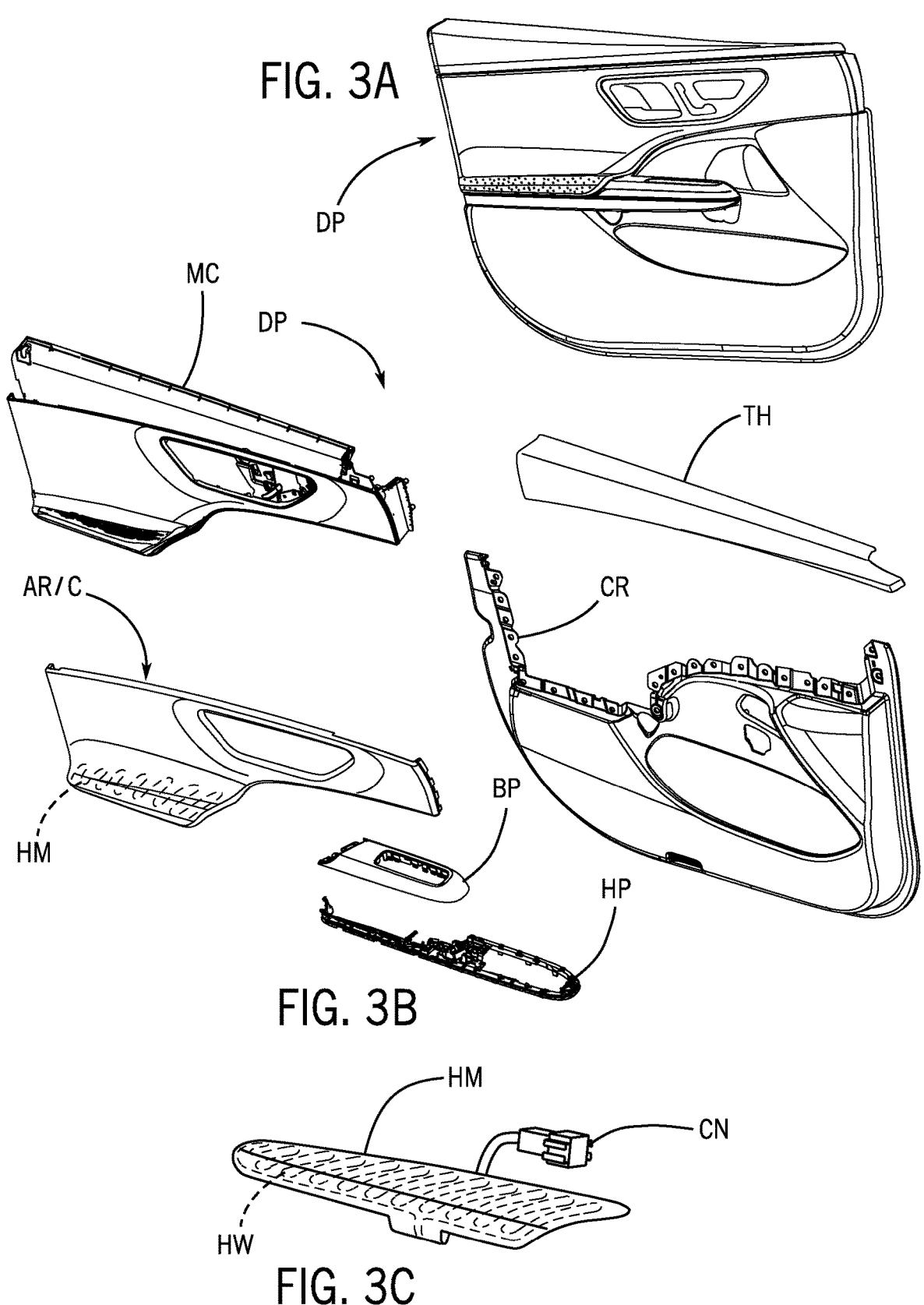
FIG. 3A is a schematic front view of a component for a vehicle interior according to an exemplary embodiment.
FIG. 3B is a schematic exploded perspective view of a component for a vehicle interior according to an exemplary embodiment.
FIG. 3C is a schematic perspective view of a component for a vehicle interior according to an exemplary embodiment.
Figure 4A:
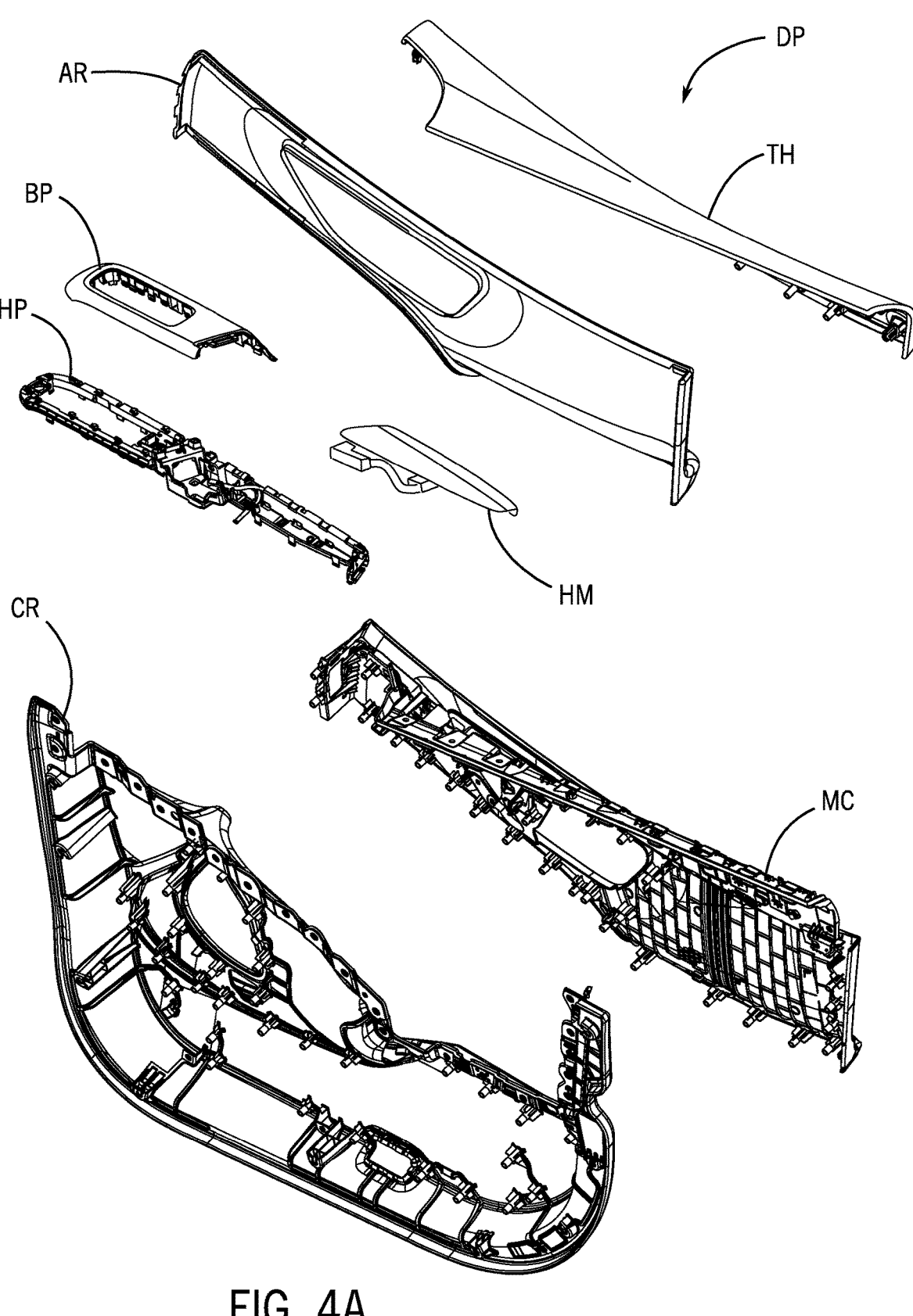
FIG. 4A is a schematic exploded perspective view of a component for a vehicle interior according to an exemplary embodiment.
Figure 4B:
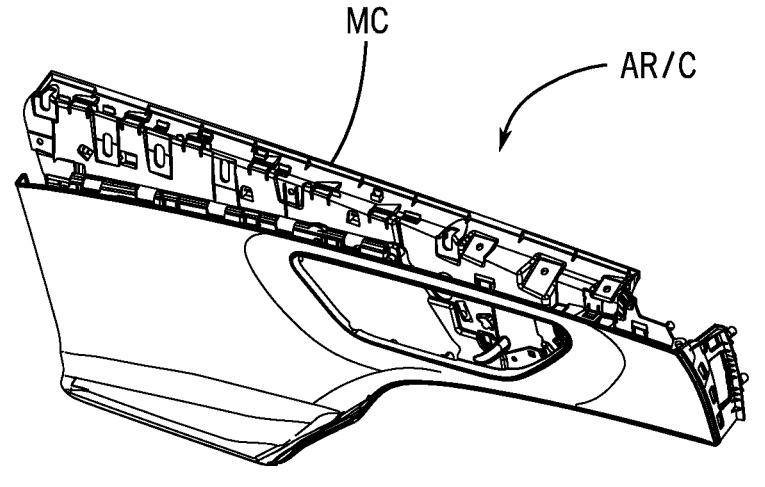
FIG. 4B is a schematic exploded perspective view of a component for a vehicle interior according to an exemplary embodiment.
Figure 4B:
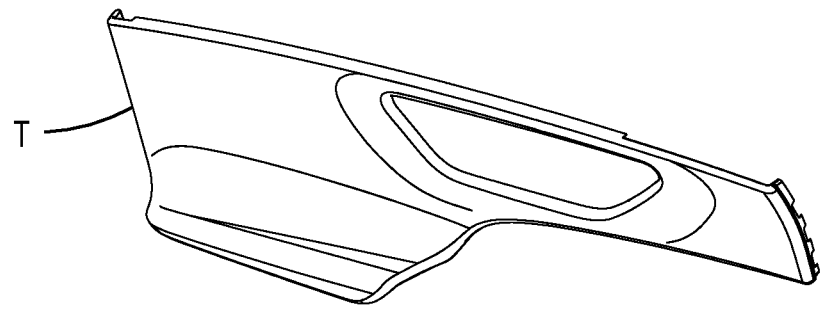
Figure 4B:
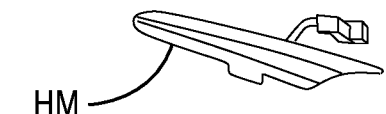
Figure 4B:
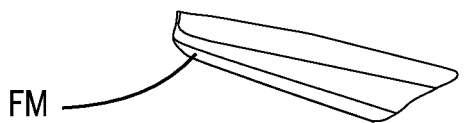
Figures 5A, 5B, 5C, 6A, 6B:
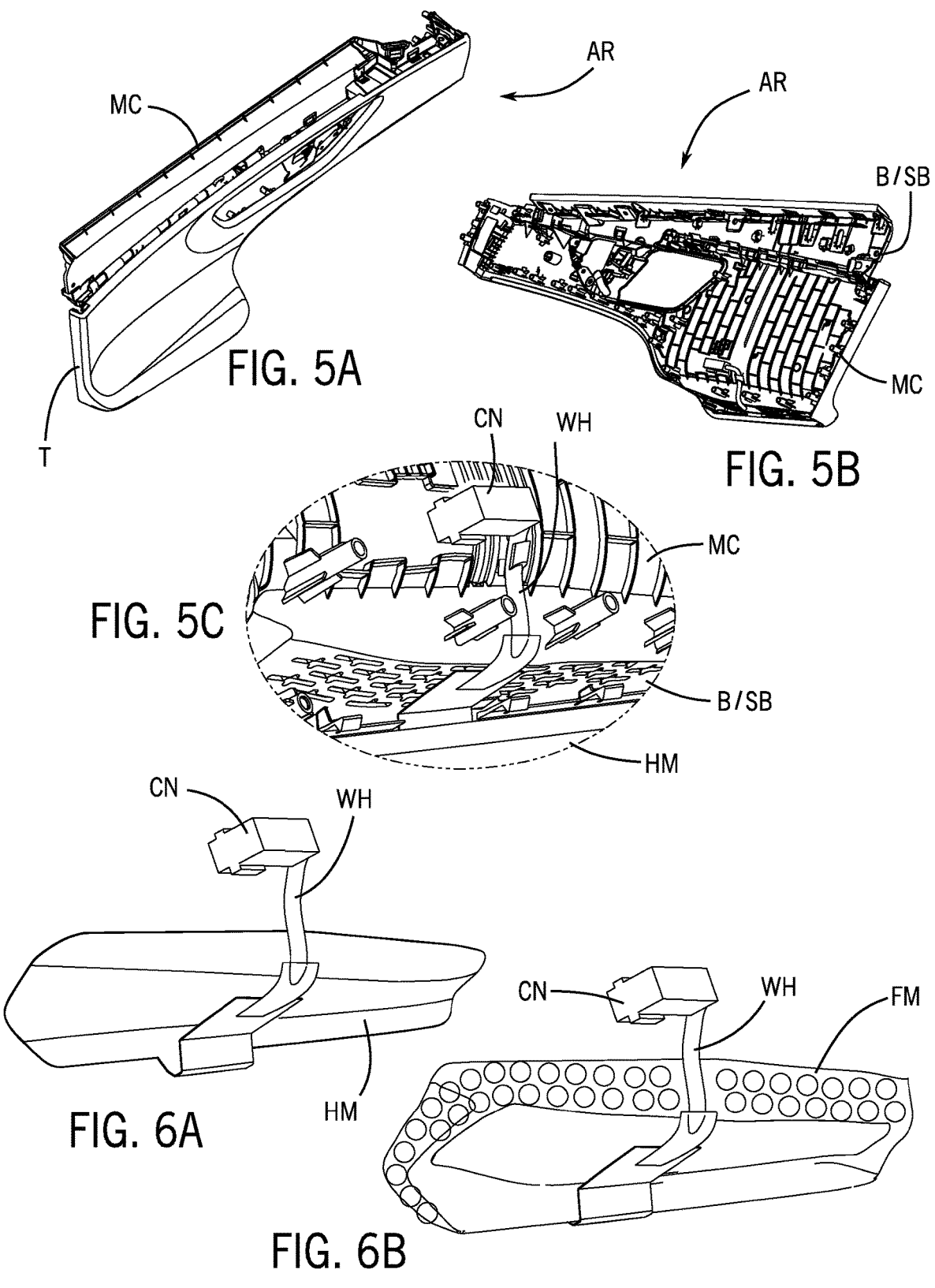
FIG. 5A is a schematic perspective view of a component for a vehicle interior according to an exemplary embodiment.
FIG. 5B is a schematic perspective view of a component for a vehicle interior according to an exemplary embodiment.
FIG. 5C is a schematic cutaway perspective view of a component for a vehicle interior according to an exemplary embodiment.
FIG. 6A is a schematic perspective view of a component for a vehicle interior according to an exemplary embodiment.
FIG. 6B is a schematic perspective view of a component for a vehicle interior according to an exemplary embodiment.
Figures 7A, 7B, 8A, 8B:
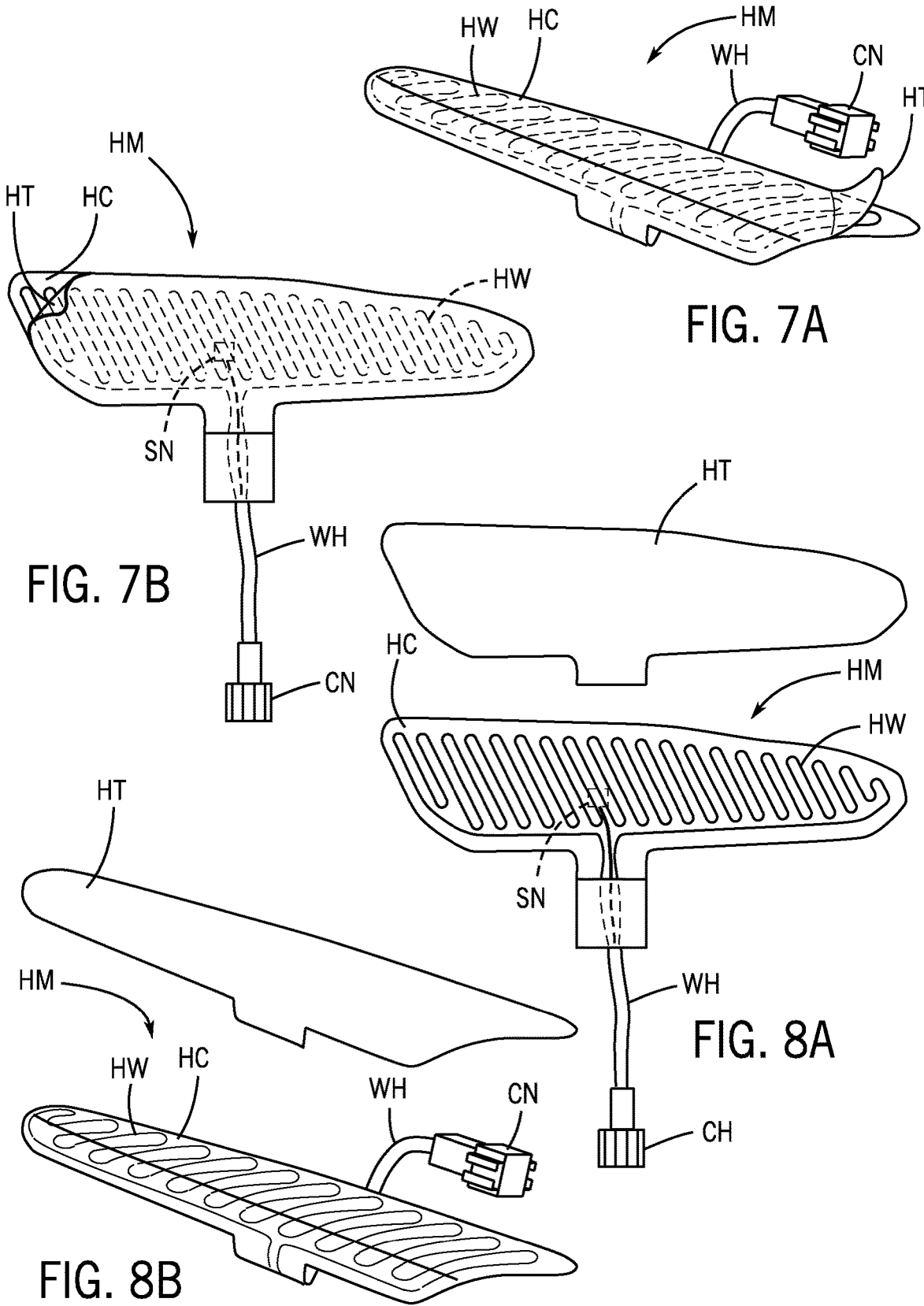
FIG. 7A is a schematic perspective view of a component for a vehicle interior according to an exemplary embodiment.
FIG. 7B is a schematic perspective view of a component for a vehicle interior according to an exemplary embodiment.
FIG. 8A is a schematic exploded perspective view of a component for a vehicle interior according to an exemplary embodiment.
FIG. 8B is a schematic exploded perspective view of a component for a vehicle interior according to an exemplary embodiment.
Figure 9A:
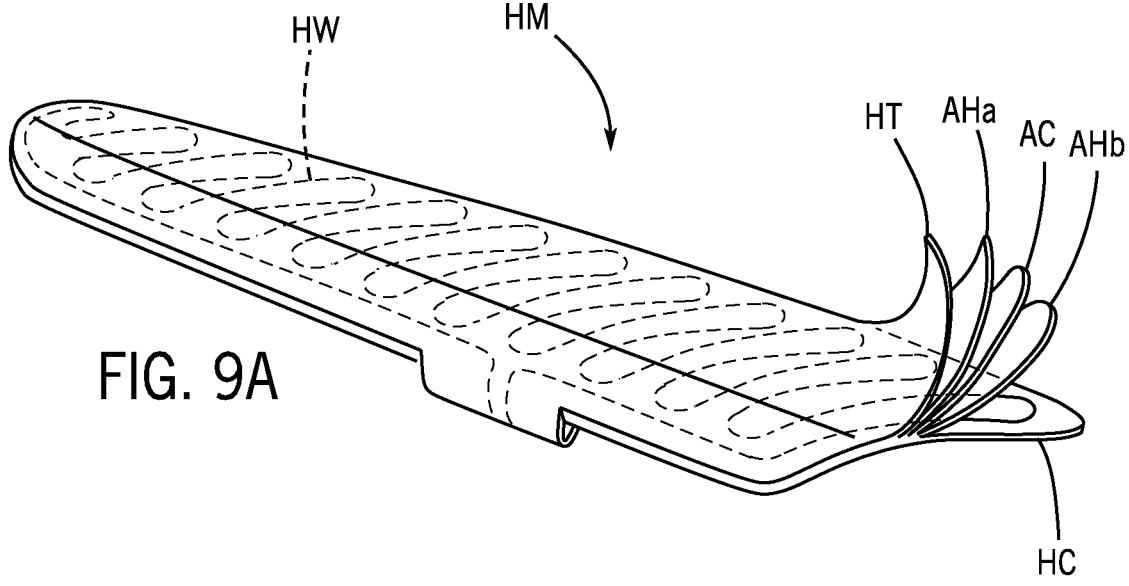
FIG. 9A is a schematic perspective view of a component for a vehicle interior with an exploded layer construction according to an exemplary embodiment.
Figure 9B:
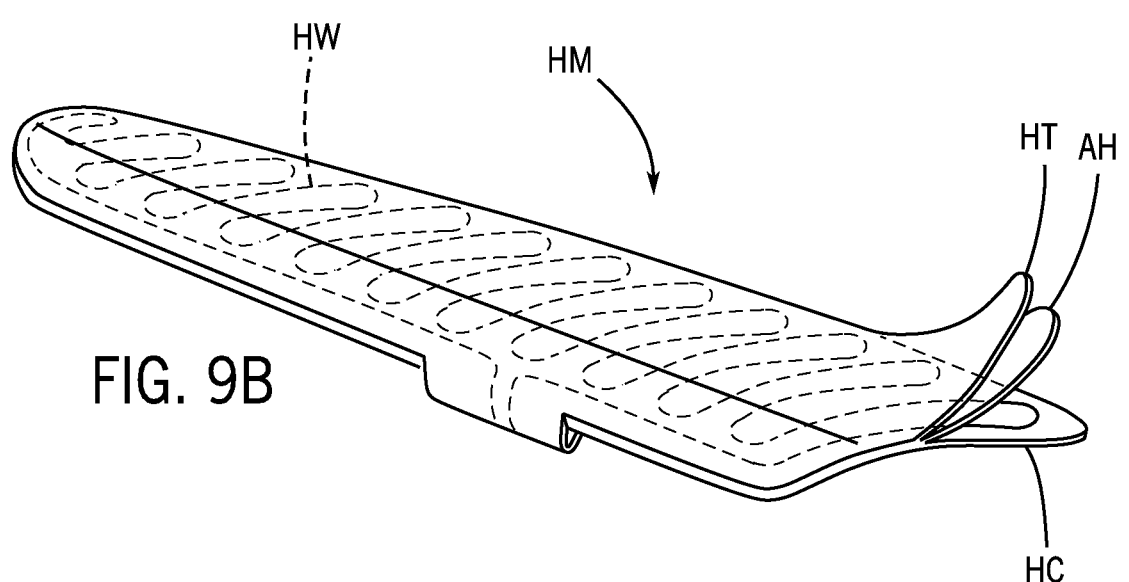
FIG. 9B is a schematic perspective view of a component for a vehicle interior with an exploded layer construction according to an exemplary embodiment.
Figures 10A, 10B, 10C, 10D, 10E, 10F, 10G:
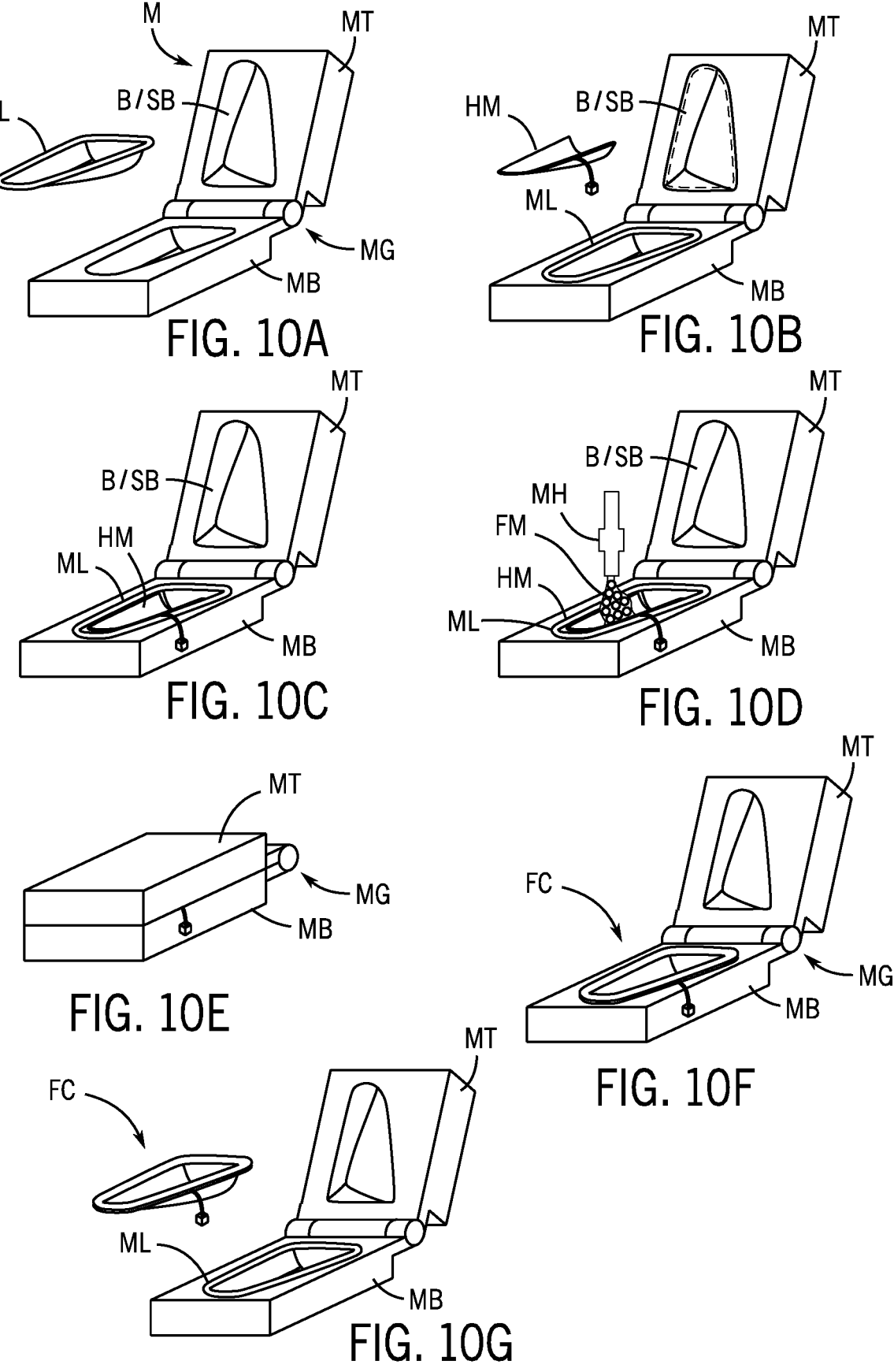
FIGS. 10A through 10G are schematic perspective views of a method for forming a component for a vehicle interior according to an exemplary embodiment.
Figures 11A, 11B, 11C, 11D, 11E, 11F, 11G:
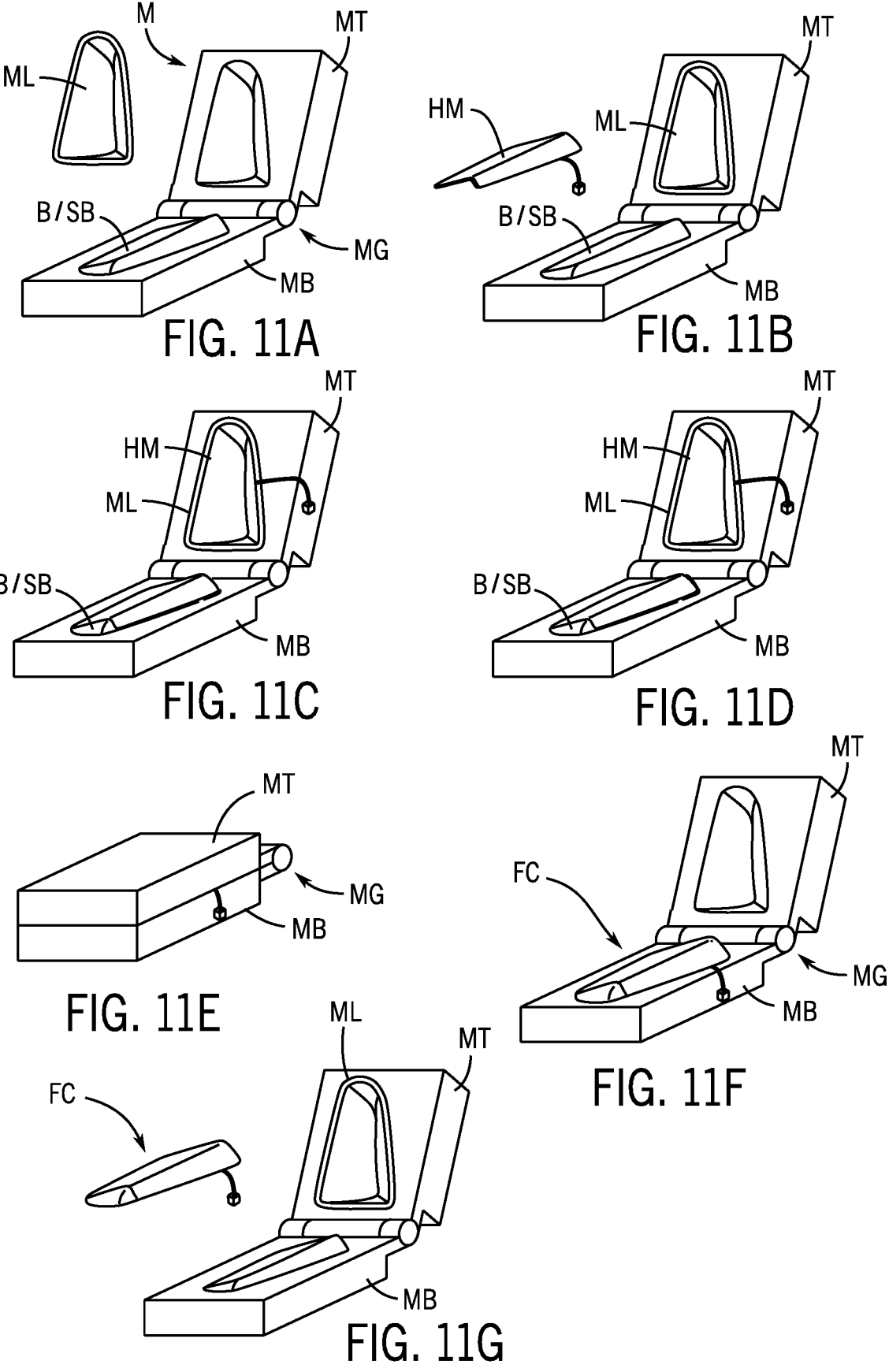
FIGS. 11A through 11G are schematic perspective views of a method for forming a component for a vehicle interior according to an exemplary embodiment.
Figures 12A, 12B:
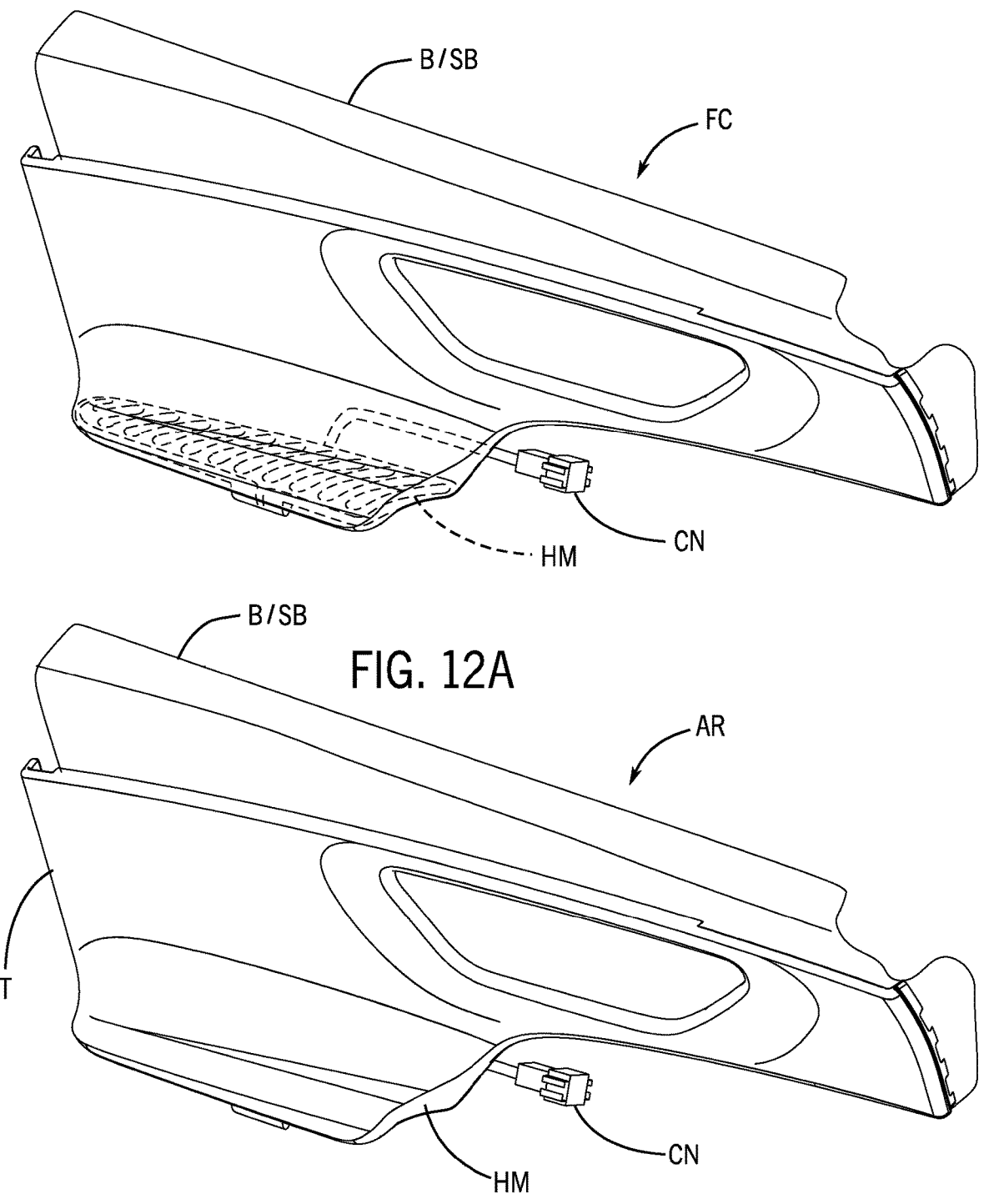
FIG. 12A is a schematic perspective view of a component for a vehicle interior according to an exemplary embodiment.
FIG. 12B is a schematic perspective view of a component for a vehicle interior according to an exemplary embodiment.
Figures 13, 14A, 14B, 15:
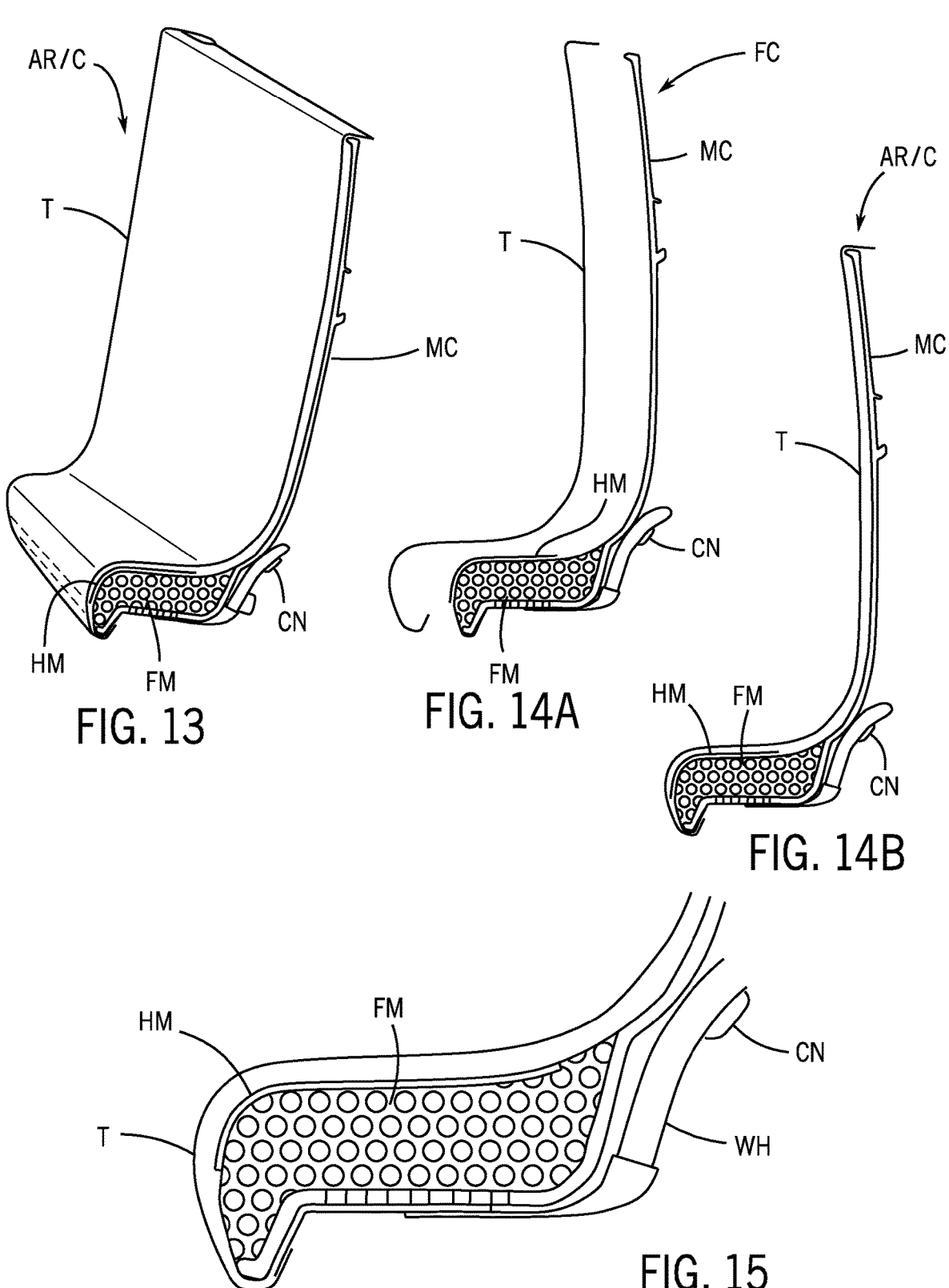
FIG. 13 is a schematic section perspective view of a component for a vehicle interior according to an exemplary embodiment.
FIG. 14A is a schematic exploded section perspective view of a component for a vehicle interior according to an exemplary embodiment.
FIG. 14B is a schematic section perspective view of a component for a vehicle interior according to an exemplary embodiment.
FIG. 15 is a schematic cutaway section view of a component for a vehicle interior according to an exemplary embodiment.
Figures 16, 17A, 17B, 18A, 18B:
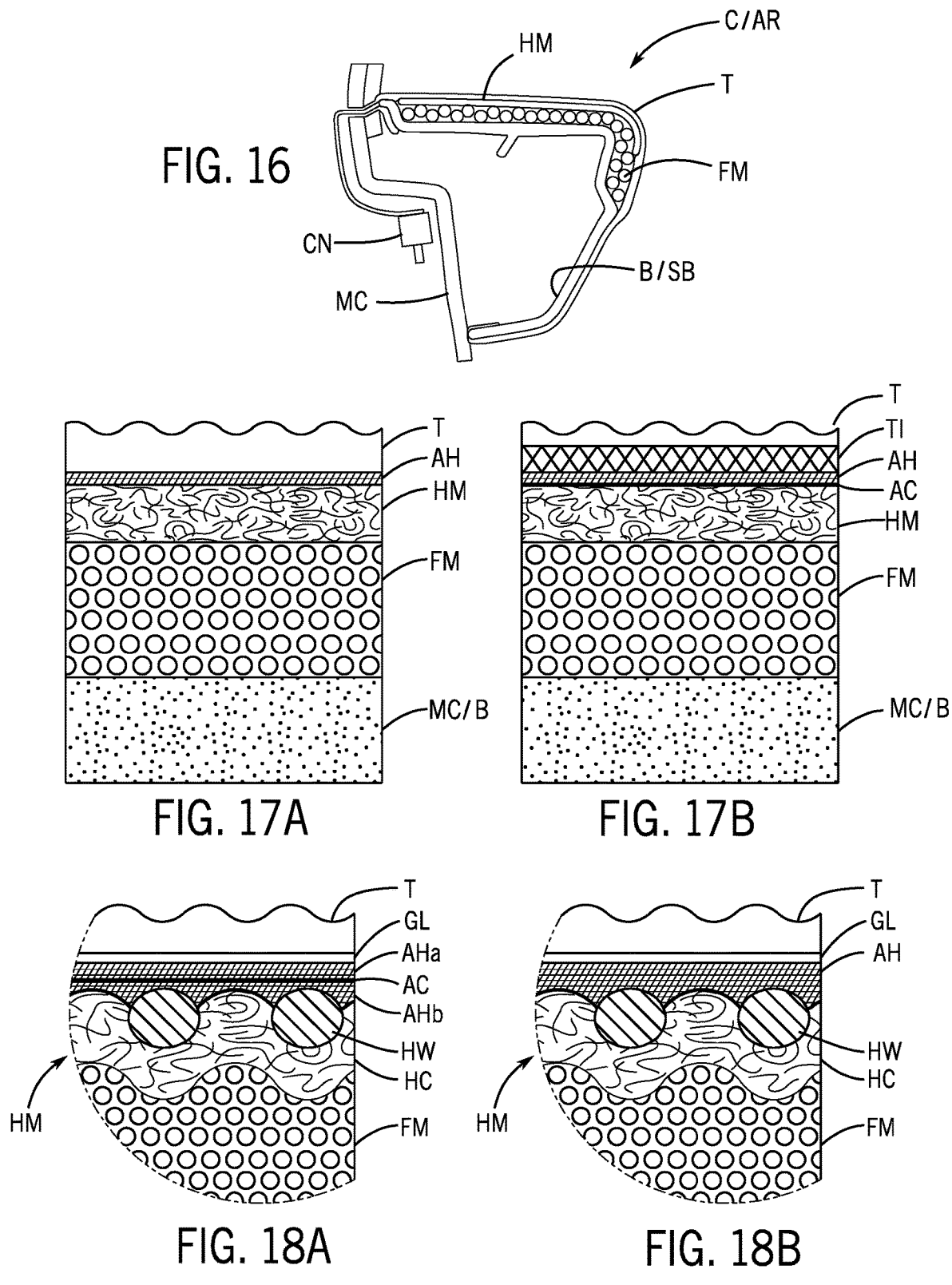
FIG. 16 is a schematic section view of a component for a vehicle interior according to an exemplary embodiment.
FIG. 17A is a schematic cutaway section view of a component for a vehicle interior according to an exemplary embodiment.
FIG. 17B is a schematic cutaway section view of a component for a vehicle interior according to an exemplary embodiment.
FIG. 18A is a schematic cutaway section view of a component for a vehicle interior according to an exemplary embodiment.
FIG. 18B is a schematic cutaway section view of a component for a vehicle interior according to an exemplary embodiment.
Figures 19, 20:
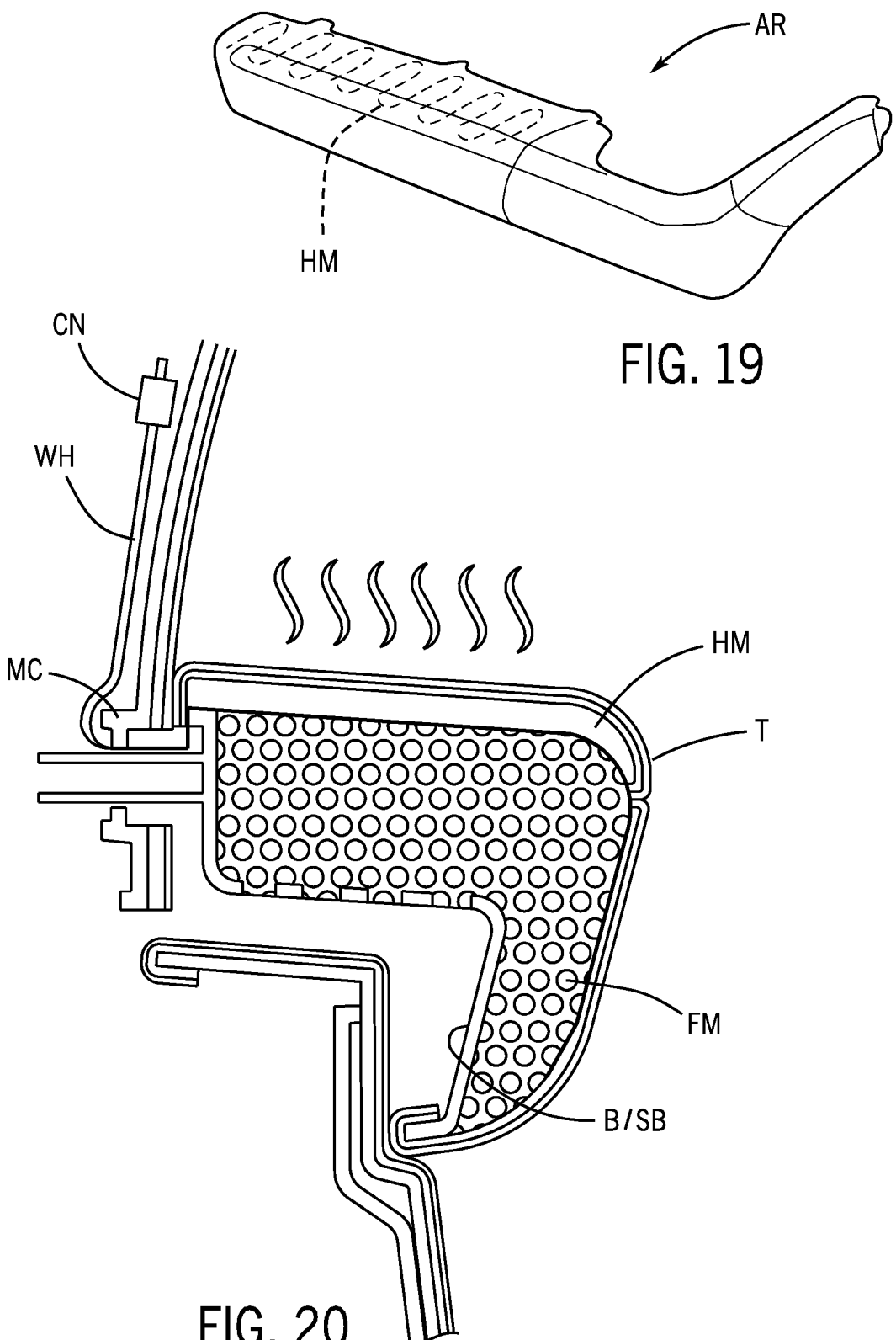
FIG. 19 is a schematic perspective view of a component for a vehicle interior according to an exemplary embodiment.
FIG. 20 is a schematic cutaway section view of a component for a vehicle interior according to an exemplary embodiment.
Figures 21A, 21B, 21C, 21D, 21E, 21F, 21G, 21H:
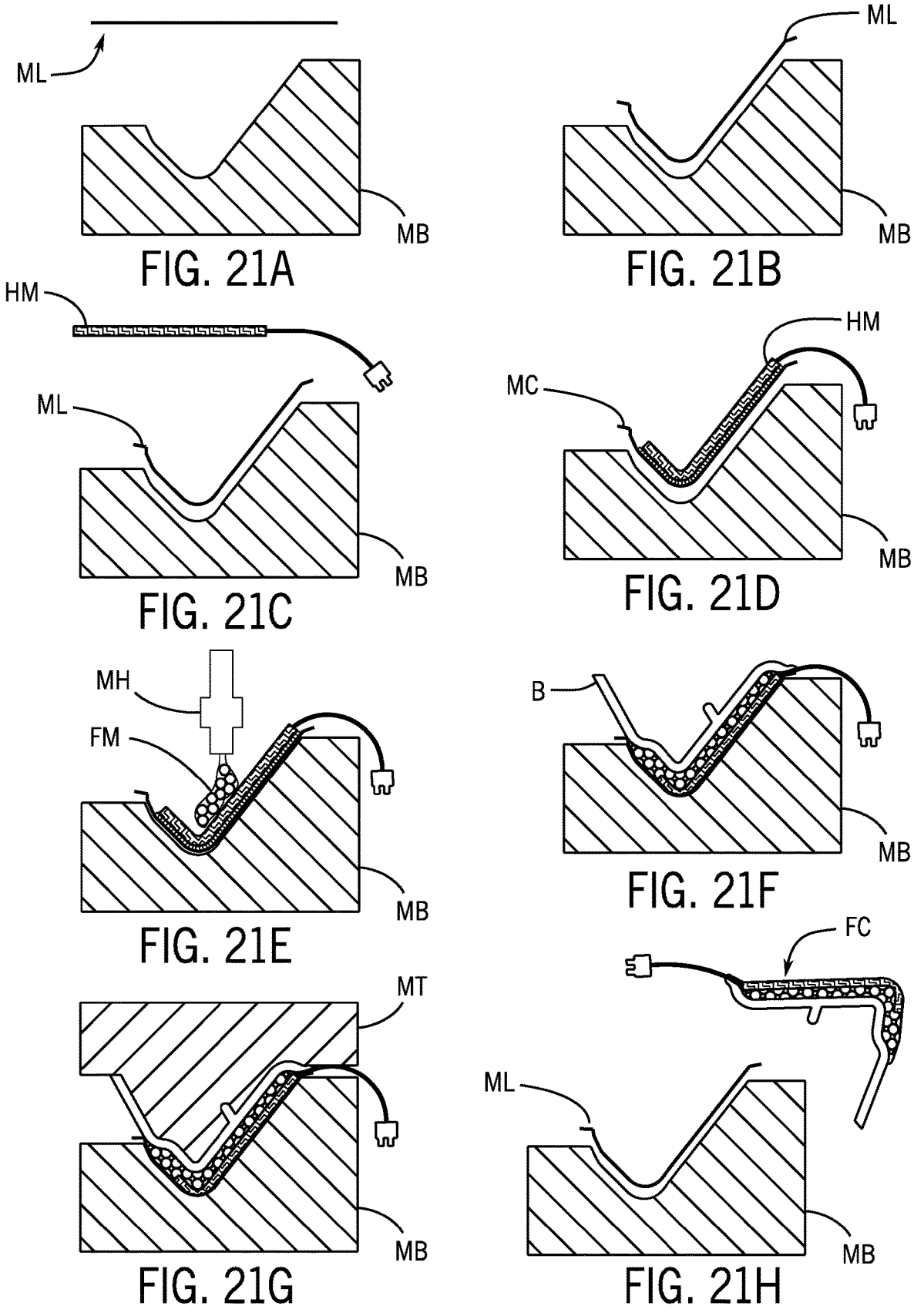
FIGS. 21A through 21H are schematic section views of a method for forming a component for a vehicle interior according to an exemplary embodiment.
Figures 22A, 22B, 22C, 22D, 22E, 22F, 22G, 22H:
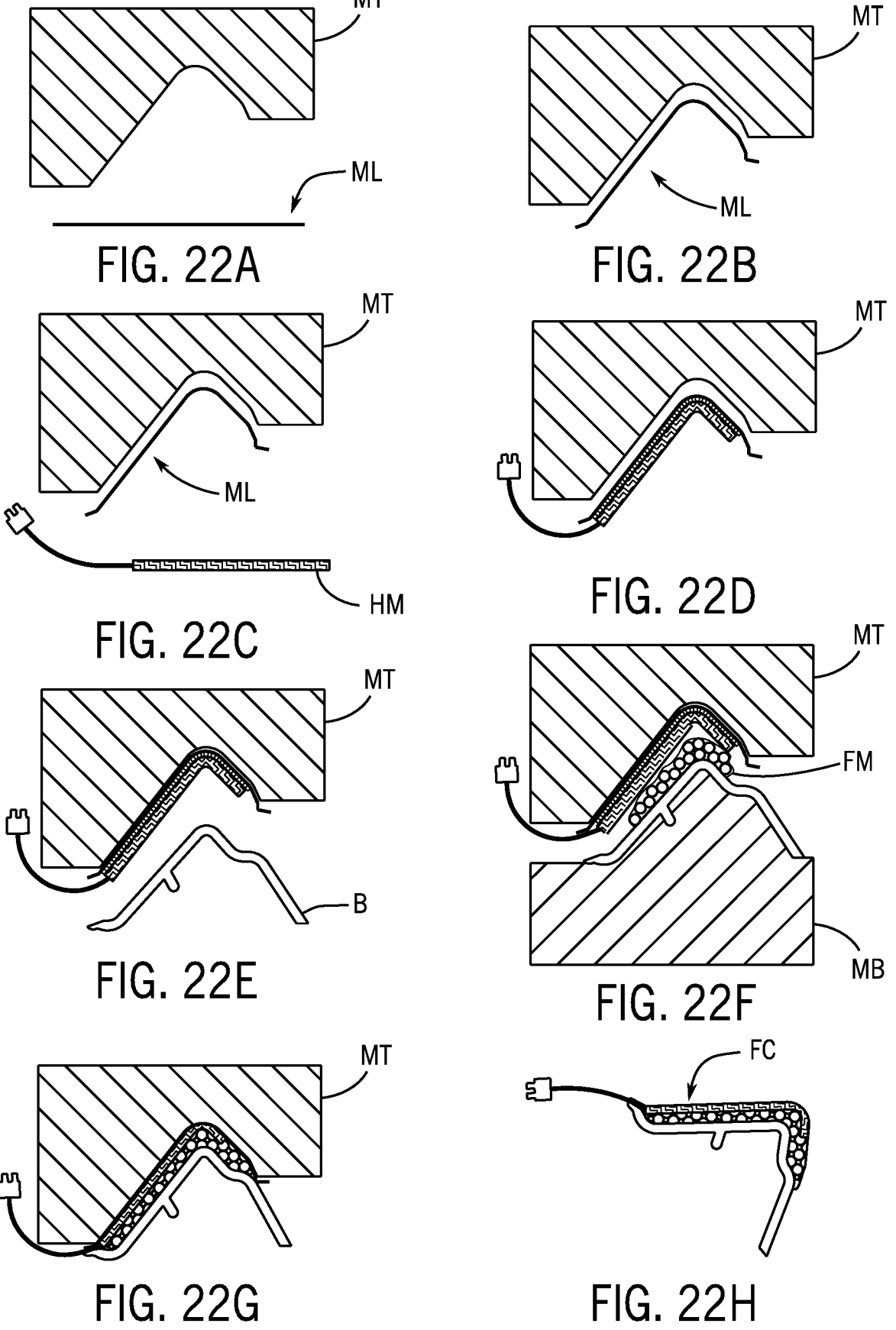
FIGS. 22A through 22H are schematic section views of a method for forming a component for a vehicle interior according to an exemplary embodiment.
Figures 23A, 23B, 23C, 23D, 23E, 23F, 23G, 23H:
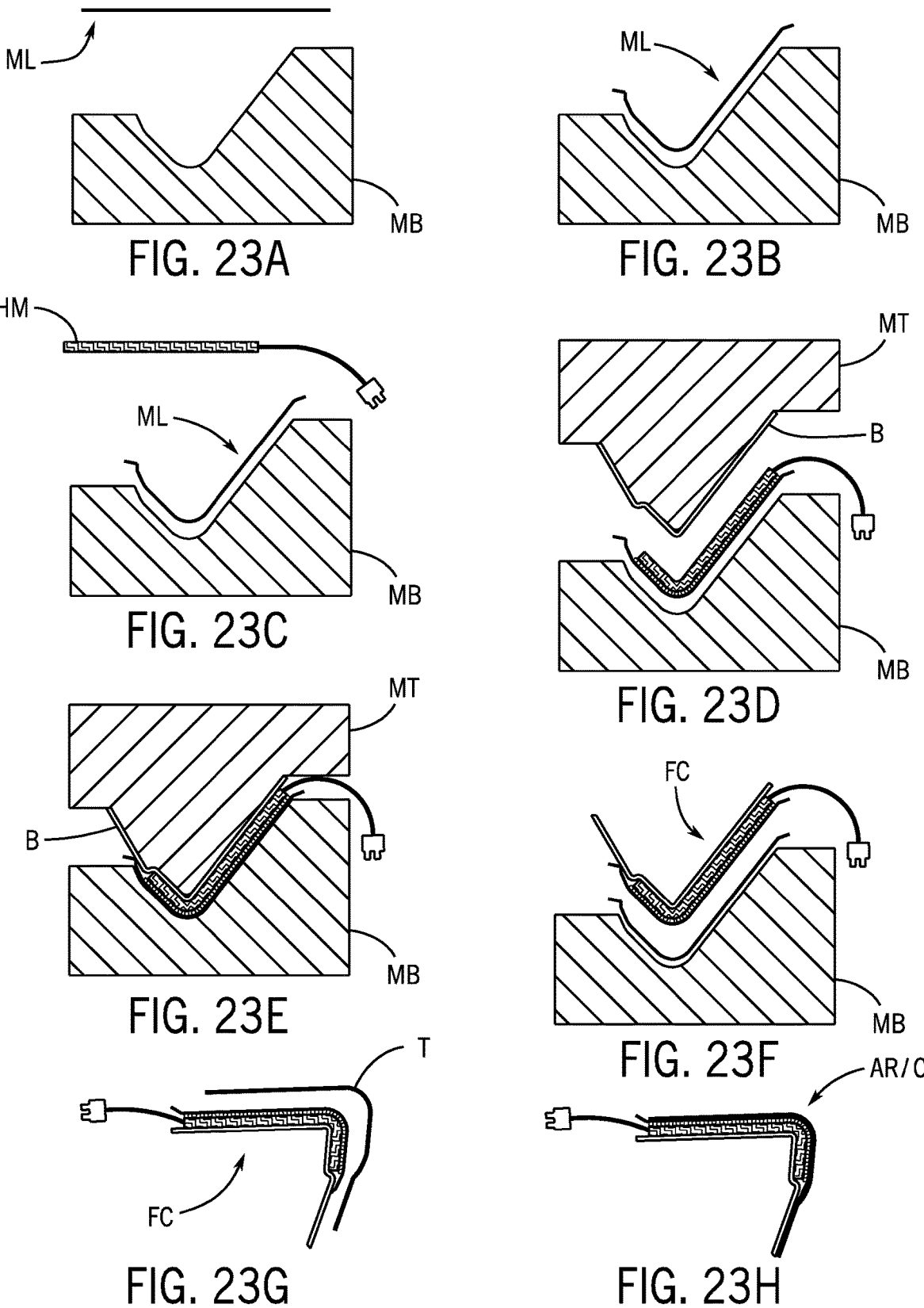
FIGS. 23A through 23H are schematic section views of a method for forming a component for a vehicle interior according to an exemplary embodiment.
Figure 24A:
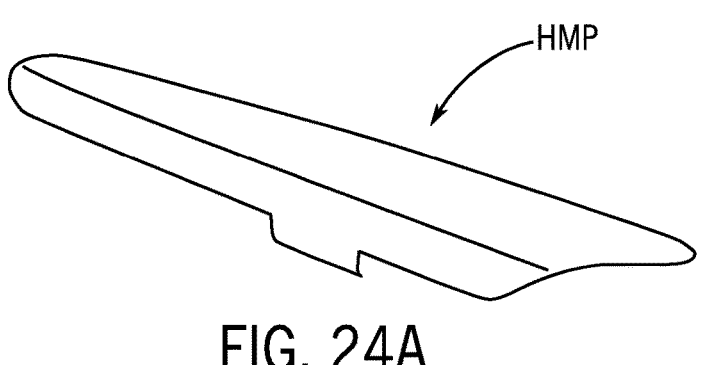
FIG. 24A is a schematic cutaway section view of a part for a component for a vehicle interior according to an exemplary embodiment.
Figure 24B:
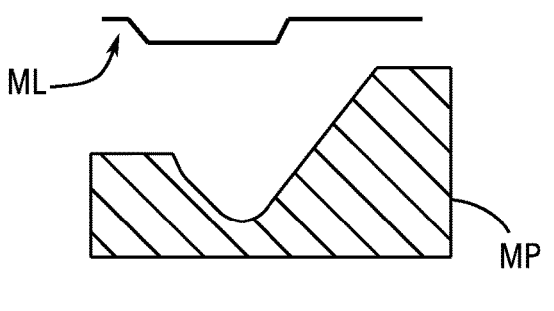
FIGS. 24B through 24K are schematic section views of a method for forming a component for a vehicle interior according to an exemplary embodiment.
Figure 24C:
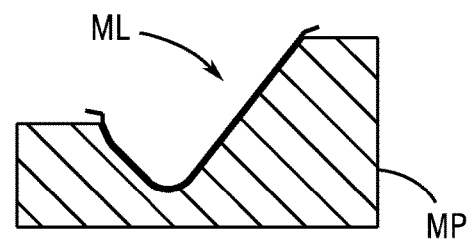
Figure 24D:
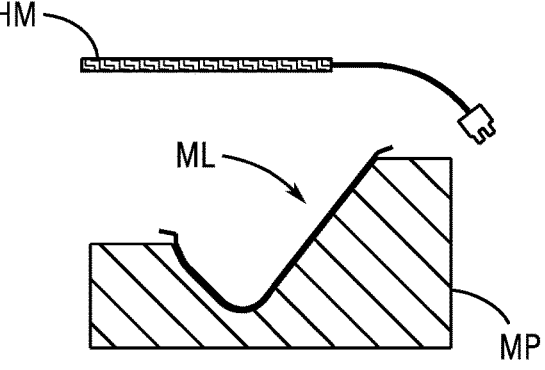
Figure 24E:
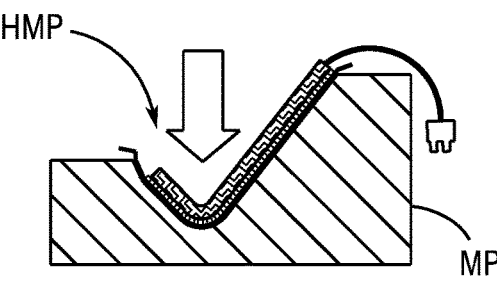
Figure 24F:
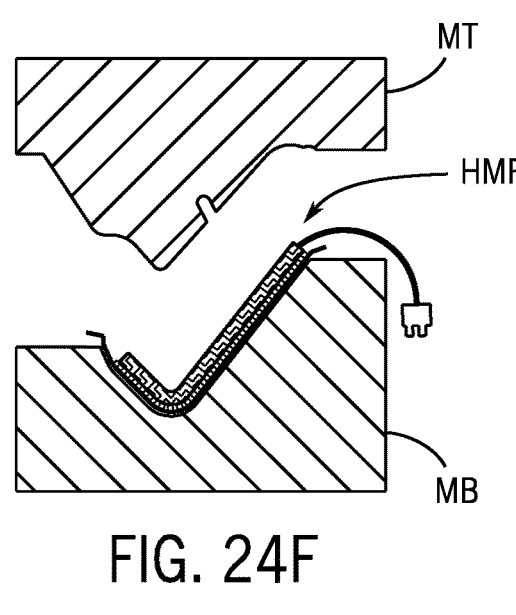
Figure 24G:
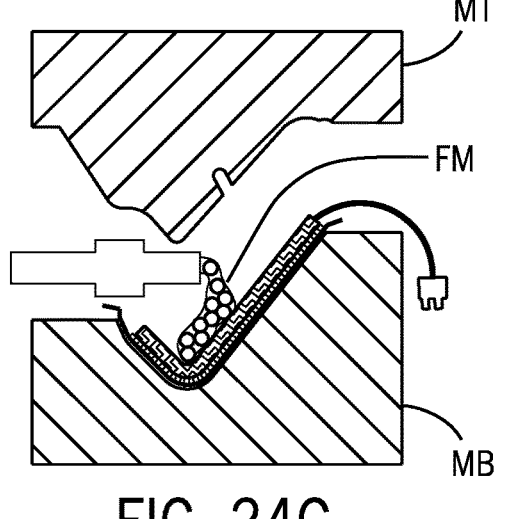
Figure 24H:
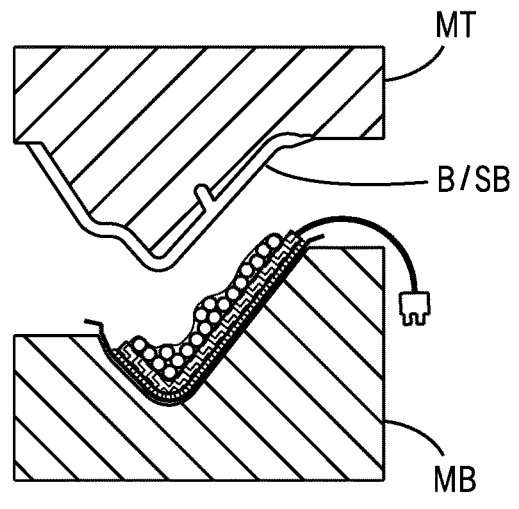
Figure 24I:
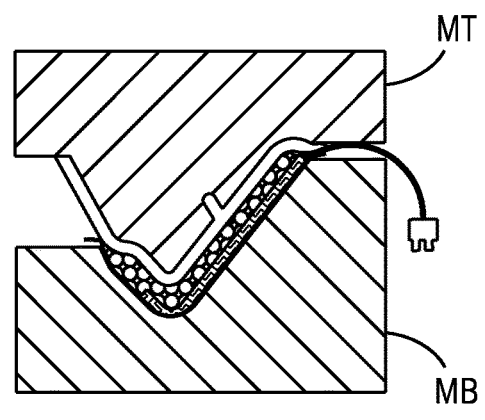
Figure 24J:
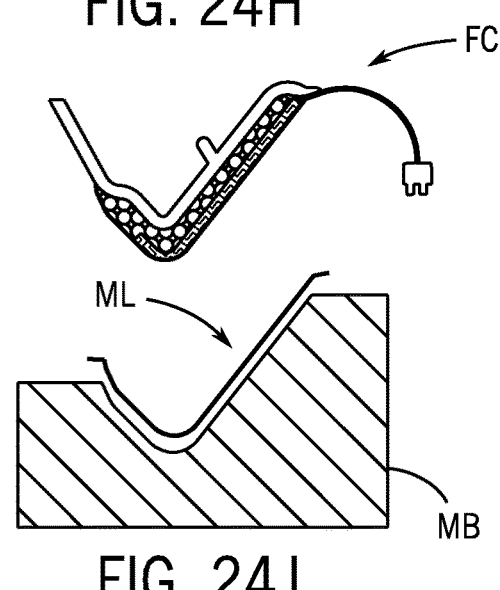
Figure 24K:
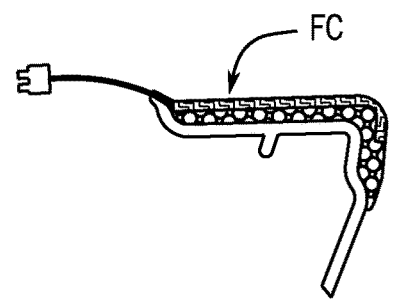
Figure 25A:
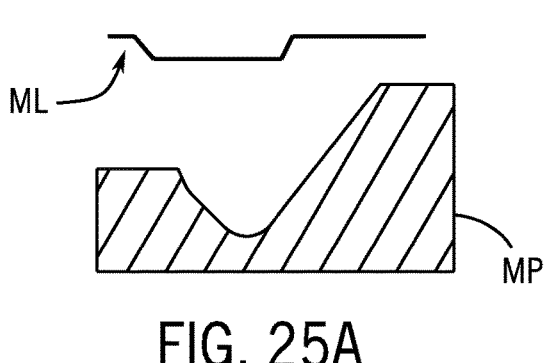
FIGS. 25A through 25L are schematic section views of a method for forming a component for a vehicle interior according to an exemplary embodiment.
Figure 25B:
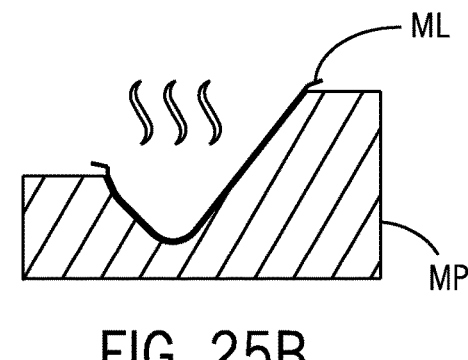
Figure 25C:
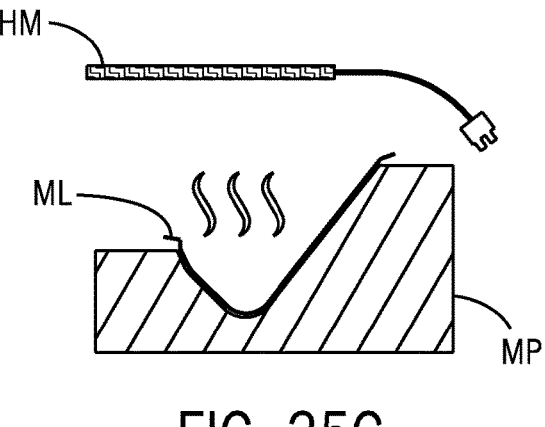
Figure 25D:
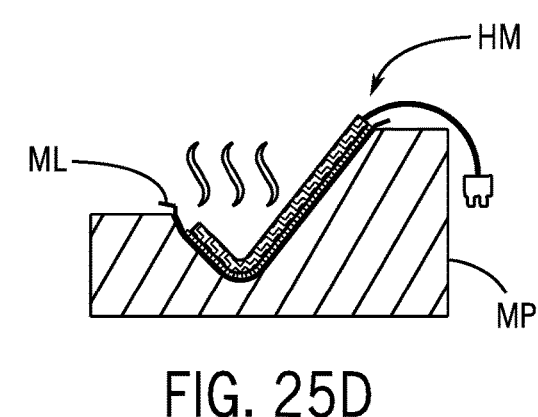
Figure 25E:
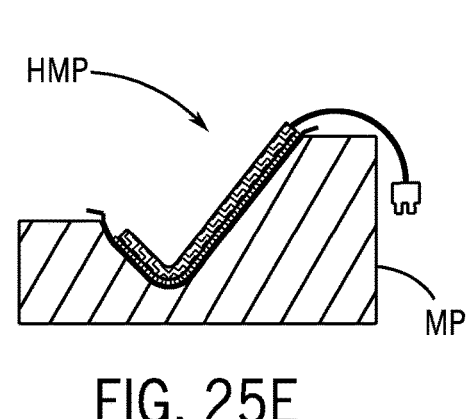
Figure 25F:
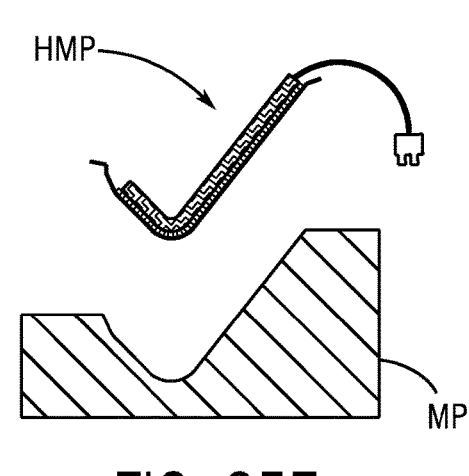
Figure 25G:
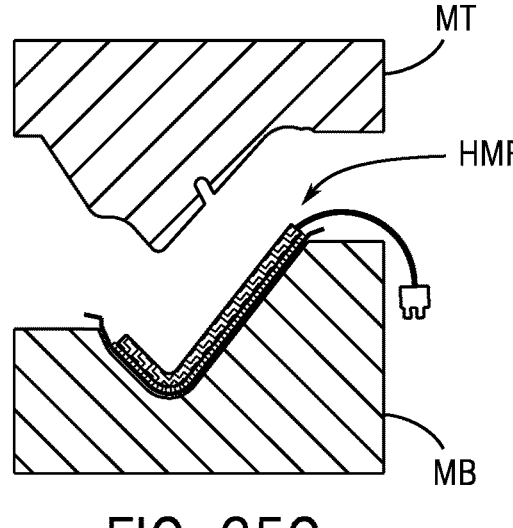
Figure 25H:
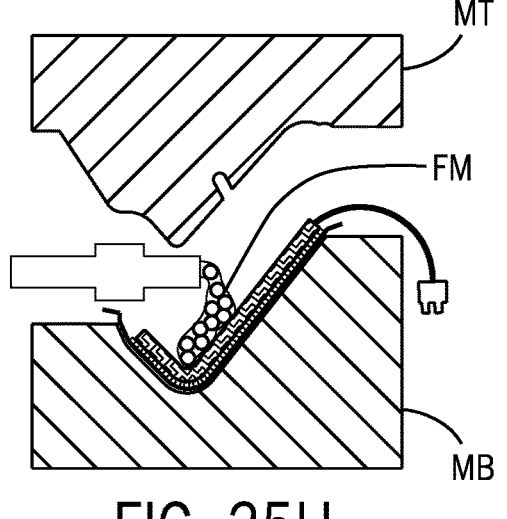
Figure 25I:
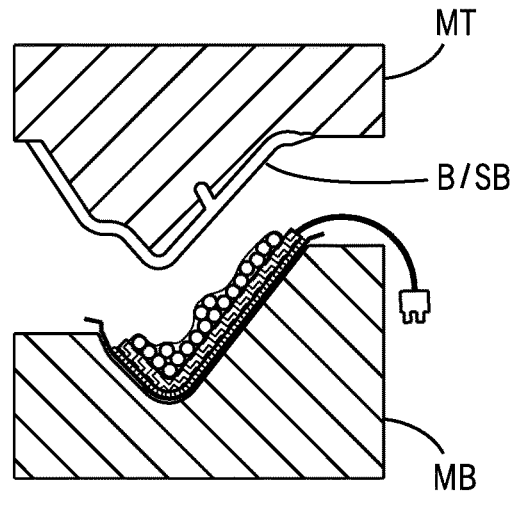
Figure 25J:
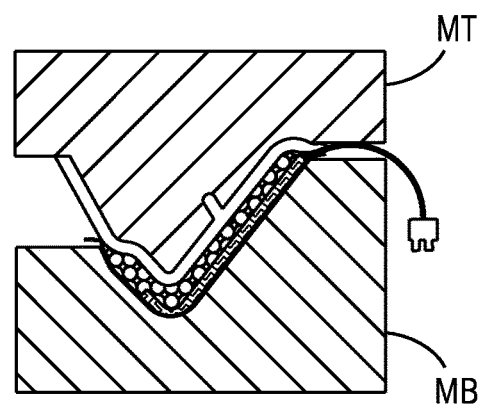
Figure 25K:
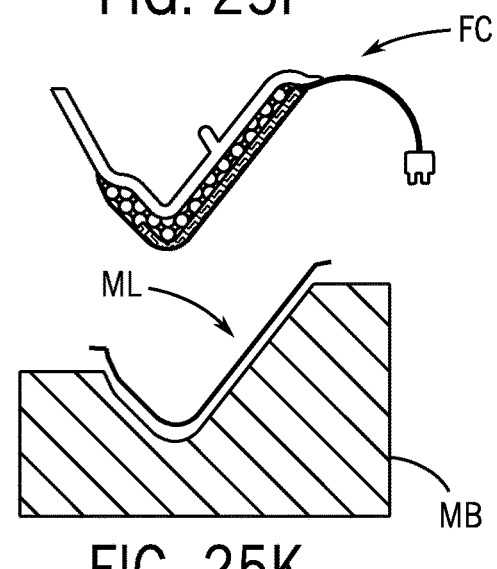
Figure 25L:
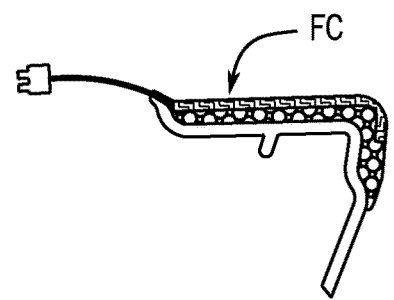

Referring to FIGS. 1A-1B and 2, a vehicle V is shown with an interior I comprising interior/trim components such as a door panel DP with a component/section shown as an armrest AR/C.

According to an exemplary embodiment shown schematically in FIGS. 2, 3A-3B, 4A-4B and 5A-5C, door panel DP may comprise sections such a carrier/base section CR and a mid-structure section MC and an upper section TH and armrest section/component AR/C; door panel DP may comprise a housing/plate HP and a bezel/plate BP for the operator control/door pull handle.

According to an exemplary embodiment shown schematically in FIGS. 3C, 4A-4B, 6A-6B, 7A-7B, 8A-8B and 9A-9B, the component such as armrest section AR may comprise a heater element/mat HM with connector/plug CN configured to provide heating/thermal management for enhancement of occupant comfort within the vehicle interior. See also FIGS. 1B, 2, 12A-12B, 13, 14A-14B, 15, 16, 19 and 20.

According to an exemplary embodiment shown schematically in FIGS. 6A-6B, 7A-7B and 8A-8B, heater element HM may comprise a body/mat HC (e.g. a fleece/mat material, non-woven, fabric, etc.) and heater wires HW (e.g. electrical conductors providing resistance to generate heat), a sensor SN, a wire harness WH with a plug-socket/connector CN coupled to heater wires HW (and sensor SN); heater element HM may be provided with a removable/peel-away cover HT. According to an exemplary embodiment shown schematically in FIGS. 9A-9B, 16, 17A-17B and 18A-18B, heater element HM may comprise a set of adhesive layers AH with a carrier AC; heater element HM may be configured for adhesive layers AH such as with adhesive/tape or adhesive/web AC or adhesive/glue GL for the forming/assembly process onto base/substrate SB and within the composite structure of component C; the composite structure of the component may comprise other combinations of elements/features (e.g. spacer, spacer fabric, air gap, divider/frame, perforations, etc.).

According to an exemplary embodiment shown schematically in FIGS. 6A-6B, 7A-7B, 8A-8B, 18A-18B, heater element/mat HM may comprise a body HC comprising fleece (e.g. weight/grammage 40 g/sq m with thickness of 0.3-0.4 mm) with heating wires arranged to provide thermal performance as required/intended in the application/specification; the heater element/mat may comprise a peel-off/away cover; the heater element/mat will be formed to provide a permanent attachment toward the substrate (within the component) and a temporary attachment to the tool liner (during the formation process); the formed component with the heater element/mat and foam material may be formed in a tool such as a foaming tool/foam-in-place tool (e.g. with efficient process/cycle time); the formed component may be formed in a vacuum tool. See also FIGS. 9A-9B, 16 and 17A-17B.

According to an exemplary embodiment shown schematically in FIGS. 16, 17A-17B and 18A-18B, formed component FC/C with heater element/mat HM may be configured to provide a surface that is smooth in texture and with substantially no feel-through and show-through of the wires of the heater element/mat (e.g. reduced visual perceptibility and reduced tactile perceptibility). See also FIGS. 12A-12B, 13, 14A-14B, 15, 19 and 20. As indicated schematically in FIGS. 13, 14A-14B, 15, 16, 17A-17B, 18A-18B, 19 and 20, formed component FC may comprise a composite structure configured to be provide with a cover layer T to form the component shown as armrest assembly AR; the cover layer may comprise a décor layer; the cover layer may comprise a thin layer T or a multi-layer composite surface shown with layer T and layer TL.

As indicated schematically in FIGS. 7A-7B, 8A-8B, 9A-9B, 13, 14A-14B, 15, 16, 19 and 20, component AR formed by assembly/attachment of cover layer T to formed component FC with heater element HM positioned/fixed within the composite structure with substrate/base B/SB may be configured to provide generally even heat transfer/distribution at the surface of component AR (e.g. to facilitate comfort of the occupants of the vehicle interior, including with function of sensor SN); as indicated schematically, connector CN of heater element HM may be connected to a source of electric power from the vehicle power plant/systems.

According to an exemplary embodiment shown schematically in FIGS. 10A-10G, 11A-11G, 21A-21H, 22A-22H, 23A-23H, 28, 29, 30, 31 and 32, the formed component with heater element/mat may be produced in a process comprising fixing and positioning of the heater element/mat by self-adhesive tape in the foaming tool surface; the heater element/mat (e.g. fleece with stitched heating wires) may comprise on one side with a self-adhesive tape; the self-adhesive tape may on one side oriented to the forming tool/tool liner provide a low-adhesion adhesive (e.g. easy to remove/temporary) and on one side toward the substrate/base provide a high-adhesion adhesive (e.g. permanent adhesion for the fleece body of the heater element/mat); the heater element/mat may be positioned and attached to the surface of the tool liner; the self-adhesive tape may remain on the foamed armrest after separation from the tool liner (e.g. removal from the tool/mold); positioning and fixing of the heater element/mat may be improved with reduce cycle time for production/assembly). See also FIGS. 24A-24K and 25A-25L.

According to an exemplary embodiment shown schematically in FIGS. 10A-10G and 11A-11G, formed component FC with heater element/mat HM for component C may be produced in a process using a forming tool such as a mold M with section MB and section MT coupled by hinge MG comprising for opening the tool (to place parts and to remove the formed component) and closing the tool (to form the formed component in a foaming and/or laminating process using pressure and/or heat); as indicated schematically, a mold liner ML may be placed in a mold section with heater element HM to be affixed with adhesive AH to be formed onto a base/substrate B/SB to form formed component FC with a foam material FM (FIGS. 10A-10G) and/or as a laminate (FIGS. 11A-11G); mold liner ML may be configured as a reusable liner to remain in the tool section after removal of formed component FC (e.g. liner comprising a chemically inert material/liner, polyethylene, silicone, etc.). See also FIGS. 9A-9B, 17A-17B, 18A-18B, 21A-21H, 22A-22H, 23A-23H, 28, 29, 30, 31 and 32. As indicated schematically in FIGS. 10A-10G, the foam material may comprise an injected foam material (e.g. such as may be used for vehicle interior components). See also FIGS. 13, 14A-14B and 15.

As indicated schematically in FIGS. 9A-9B, 17A-17B and 18A-18B, adhesive AH to secure the heater element for the process/component may comprise a two-sided adhesive tape or carrier; adhesive material AH for each separate side such as adhesive AHa/AHb of the tape/carrier may separately be selected to facilitate efficient production and secure assembly of the component (e.g. low-adhesion for the heater element with the mold liner to facilitate separation/removal and high-adhesion toward the base to facilitate a strong construction within the composite structure of the formed component). See also FIGS. 13, 14A-14B, 15, 16, 19 and 20.

According to an exemplary embodiment indicated schematically in FIGS. 9A-9B, 21A-21H and 22A-22H, the composite structure of formed component FC may be formed in a tool with section MB and/or section MT with heater element HM (with adhesive AH) with a foam material FM injected from a nozzle shown as mixing head MH secured to base/substrate B; when the composite structure is removed from tool MB, mold liner ML will remain in the tool. See also FIGS. 28 and 29.

According to an exemplary embodiment indicated schematically in FIGS. 9A-9B, 23A-23H, the composite structure of formed component FC may be formed in a tool with section MB and/or section MT with heater element HM (with adhesive AH) as a press-laminate part secured to base/substrate B; when the composite structure is removed from tool MB, mold liner ML will remain in the tool; a cover T attached to formed component FC will comprise a composite structure shown as armrest assembly/section component AR/C. See also FIG. 30.

According to an exemplary embodiment indicated schematically in FIGS. 9A-9B, 24A-24L and 25A-25K, the composite structure of formed component FC may be formed in a pre-fix tool MP with liner ML and heater element HM (with adhesive AH) to provide a heater element part HMP attached with liner ML such as by force/pressure-activated adhesion (FIGS. 24B-24E) and/or thermal-activated adhesion (FIGS. 25A-25F) and removed from pre-fix tool MP; heater element part HMP may then be formed as the composite structure of formed component FC in a forming tool with section MB and/or section MT with heater element part HMP (with adhesive AH). As shown schematically in FIGS. 24F-24K and 25G-25L, the composite structure of formed component FC may comprise with a foam material FM injected from a nozzle MH secured to base/substrate B formed in the forming tool (with section MB and/or MT). As shown schematically in FIGS. 24J-24K and 25K-25L, when the composite structure of formed component FC is removed from tool section MB, mold liner ML will remain in tool section MB. See also FIGS. 31 and 32.

According to an exemplary embodiment shown schematically in FIGS. 24A-24E and 25A-25F, heater element/mat HM may be positioned/pre-fixed in a pre-fix tool MP (separate from forming/foaming tool M) to be attached to a tool liner shown as reusable/reused liner ML (e.g. attached by heat and/or pressure as indicated) with the adhesive to provide a heater element pre-form HMP; heater element pre-form HMP may be placed in forming/foaming tool M for formation into a formed component MC (e.g. by application of foam material FM) and separation from tool liner ML. See also FIGS. 24F-24K and 25G-25L.

Figure 26A:
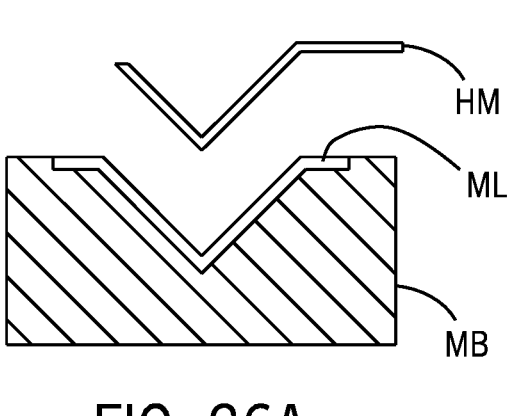
FIGS. 26A through 26F are schematic section views of a method for forming a component for a vehicle interior according to an exemplary embodiment.
Figure 26B:
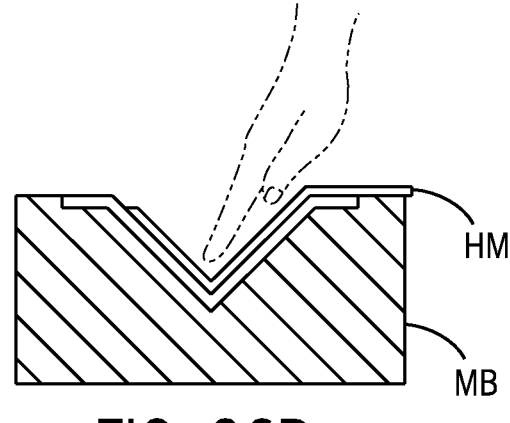
Figure 26C:
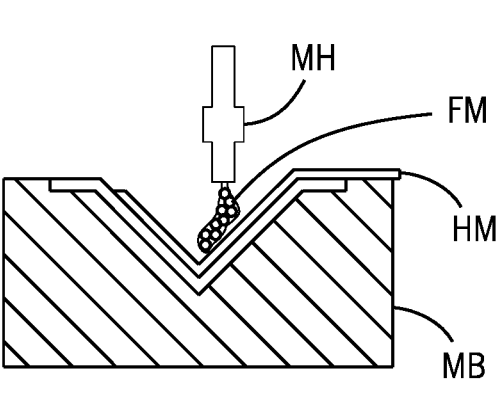
Figure 26D:
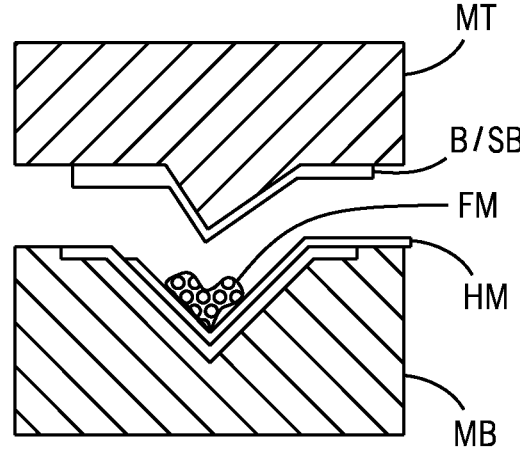
Figure 26E:
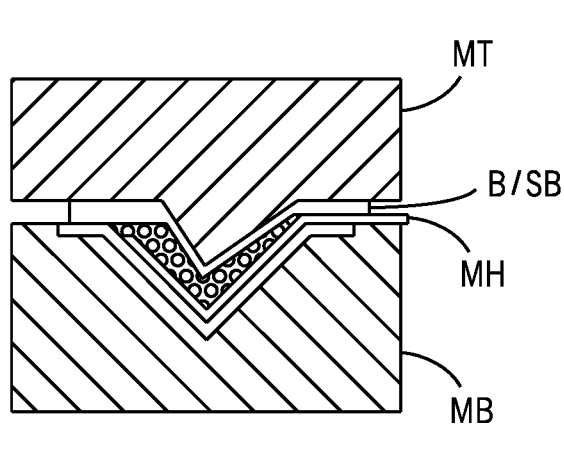
Figure 26F:
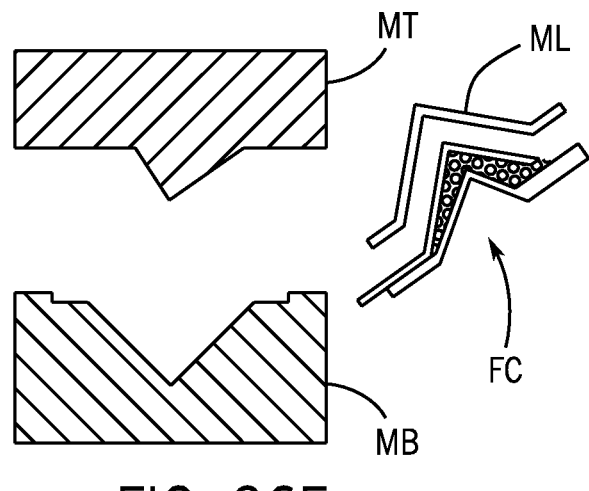
Figure 27A:
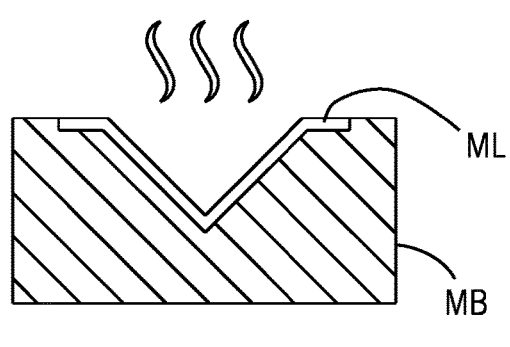
FIGS. 27A through 27F are schematic section views of a method for forming a component for a vehicle interior according to an exemplary embodiment.
Figure 27B:
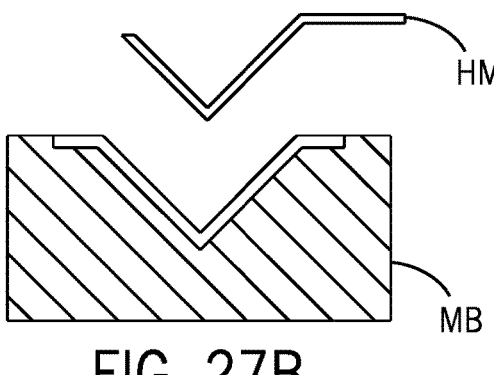
Figure 27C:
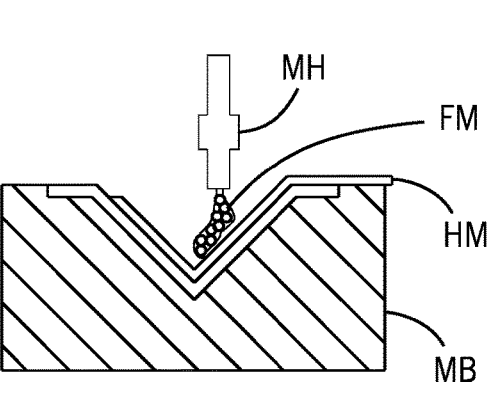
Figure 27C:
Figure 27D:
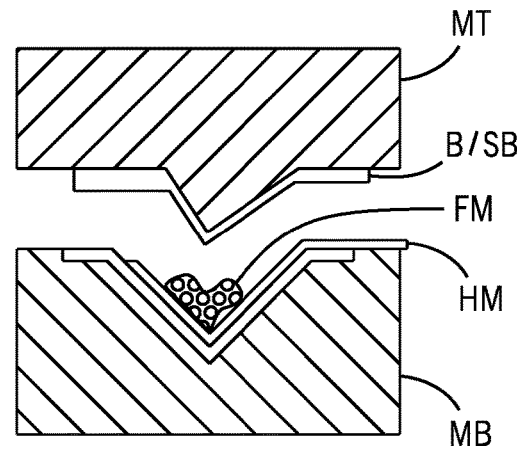
Figure 27E:
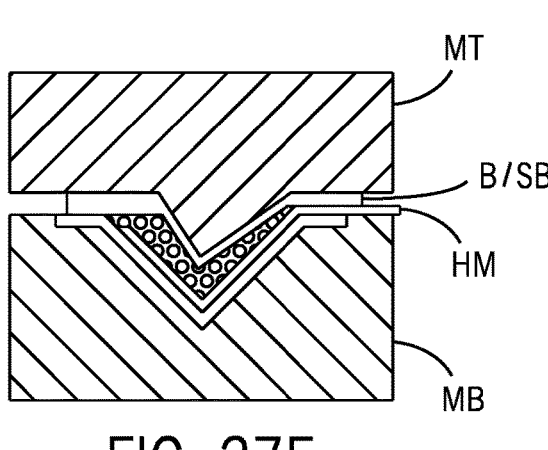
Figure 27F:
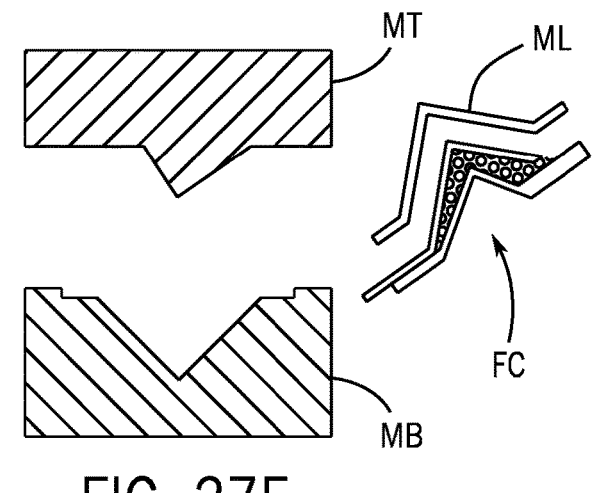
Figure 28:
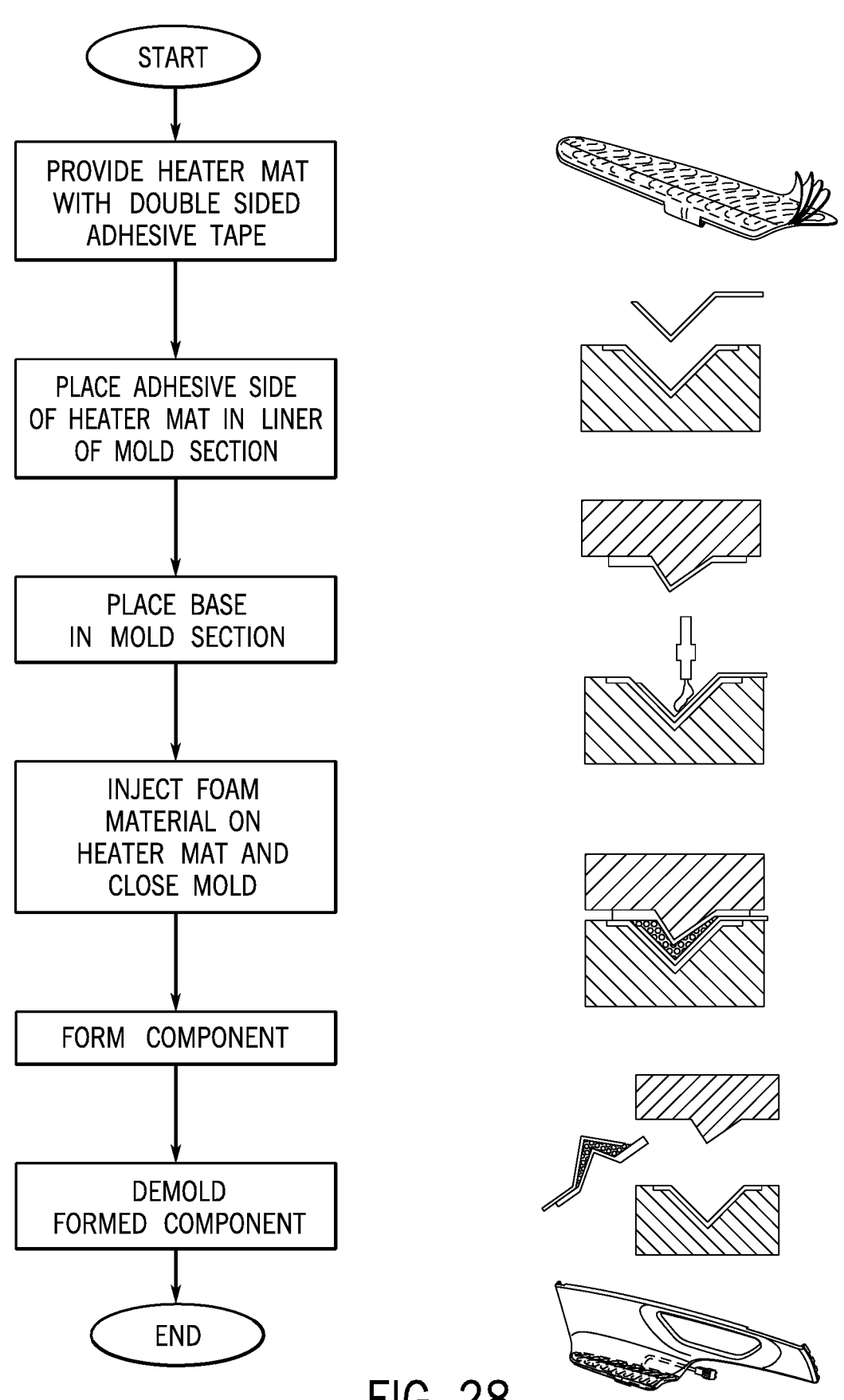
FIG. 28 is a schematic flow diagram of a method for forming a component for a vehicle interior according to an exemplary embodiment.
Figure 29:
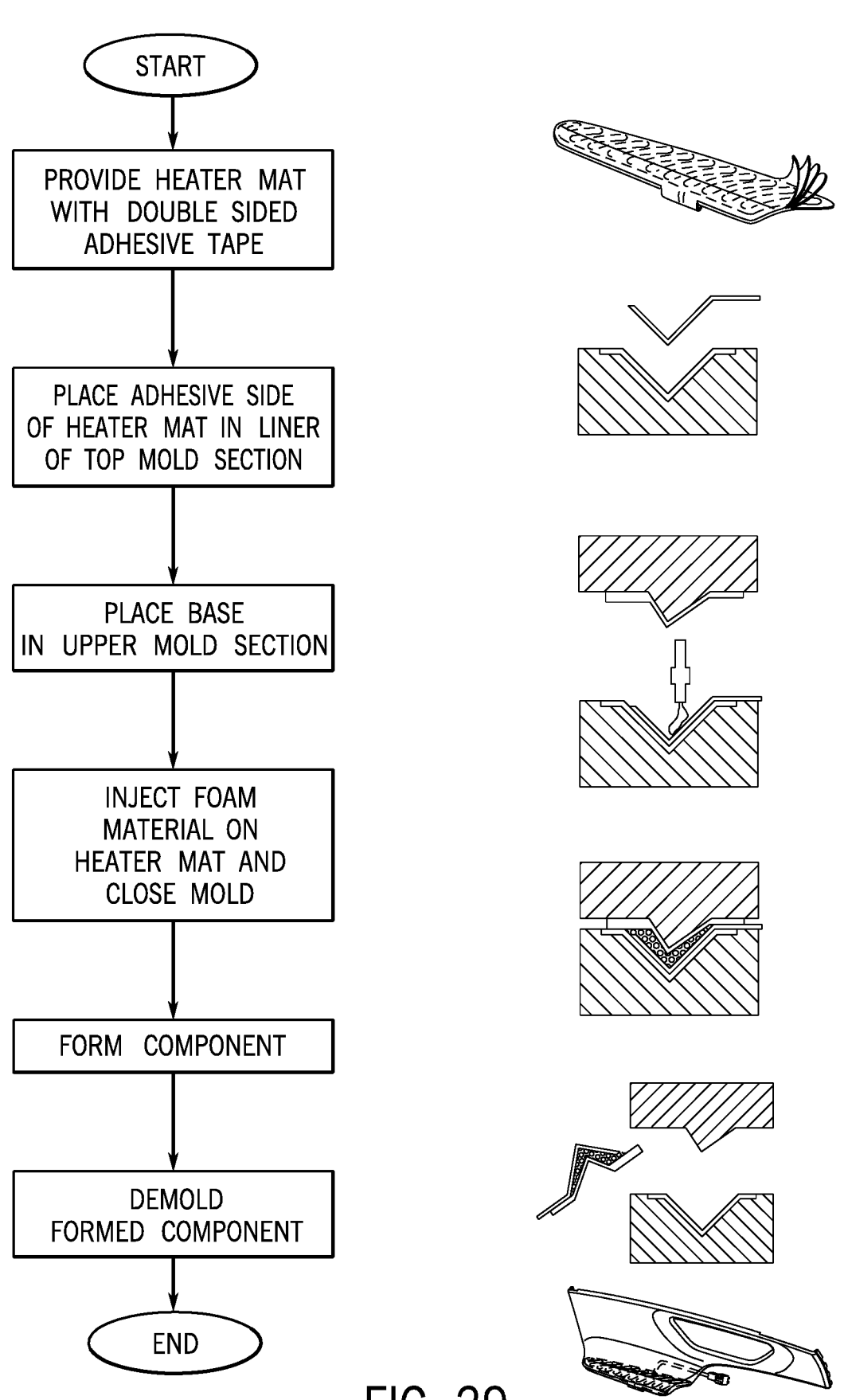
FIG. 29 is a schematic flow diagram of a method for forming a component for a vehicle interior according to an exemplary embodiment.
Figure 30:
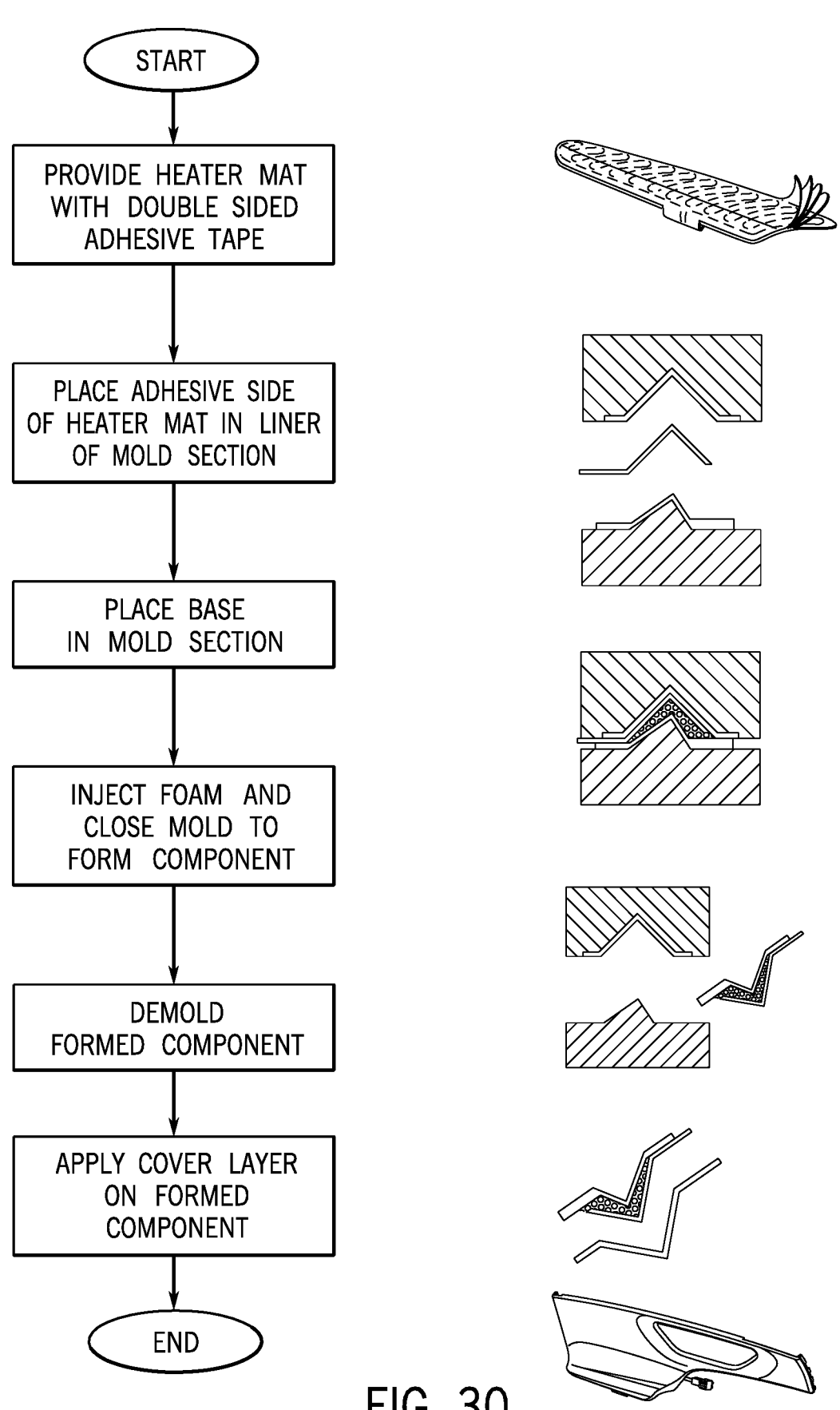
FIG. 30 is a schematic flow diagram of a method for forming a component for a vehicle interior according to an exemplary embodiment.
Figure 31:
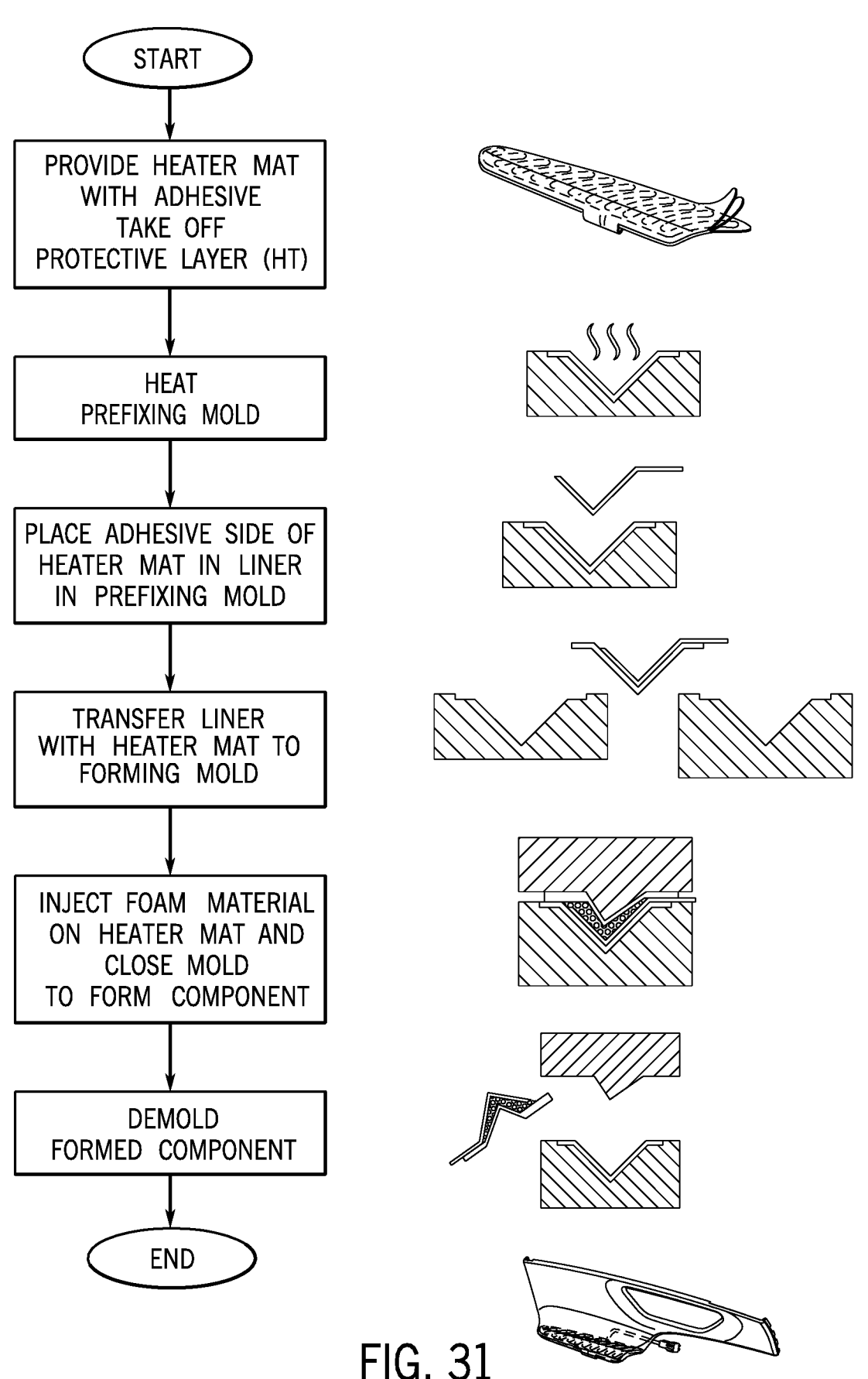
FIG. 31 is a schematic flow diagram of a method for forming a component for a vehicle interior according to an exemplary embodiment.
Figure 32:
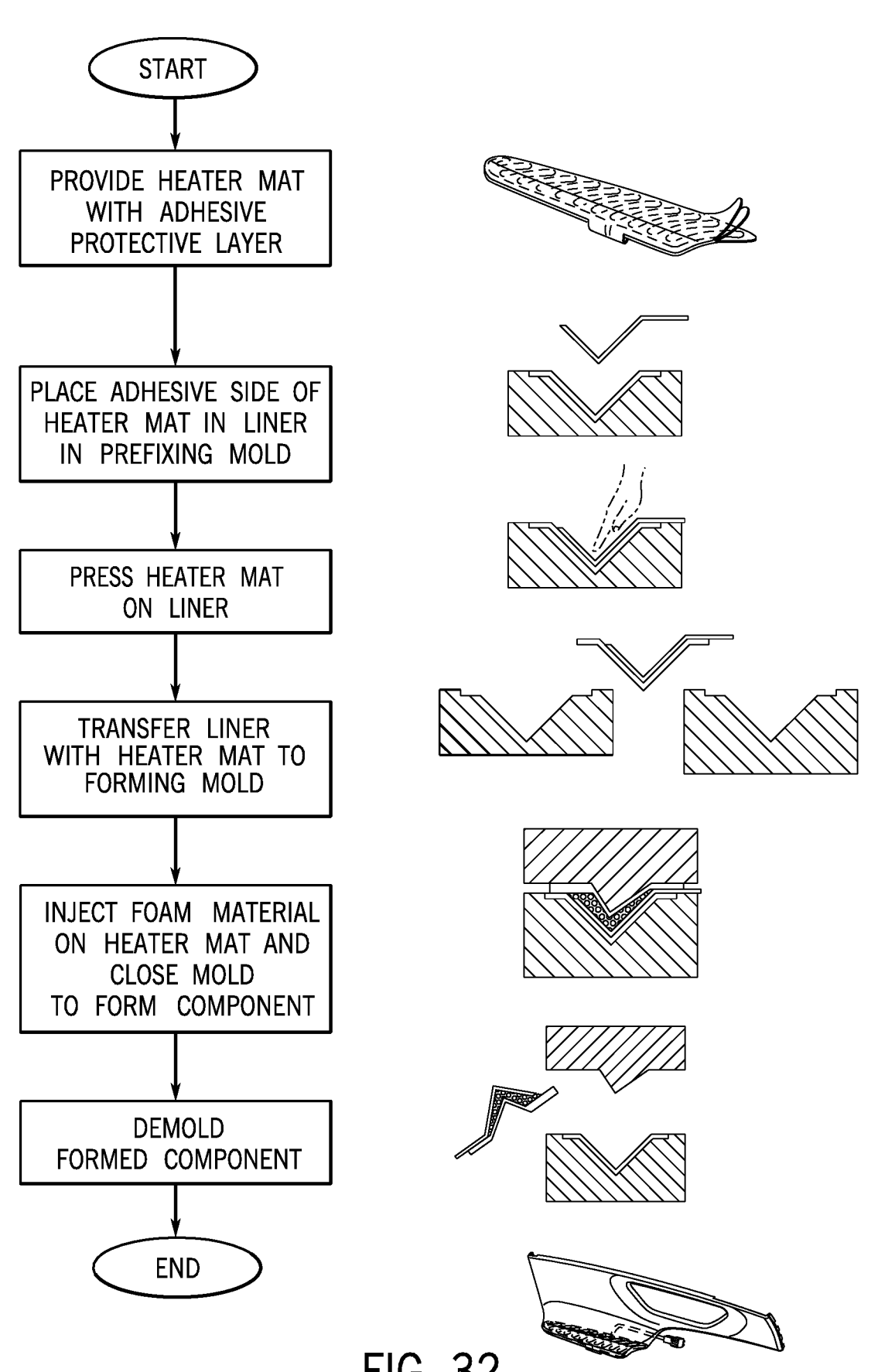
FIG. 32 is a schematic flow diagram of a method for forming a component for a vehicle interior according to an exemplary embodiment.

According to an exemplary embodiment indicated schematically in FIGS. 9A-9B, 26A-26F and 27A-27F, the composite structure of formed component FC may be formed in a tool with section MB and/or section MT with heater element HM (with adhesive AH); adhesive AH for heater element HM may be a pressure-activated adhesive (FIGS. 26A-26B) and/or heat-activated adhesive (FIGS. 27A-27B); formed component FC may be formed with a foam material FM injected from a nozzle MH secured to base/substrate B to retain heater element HM in the composite structure; when the composite structure is removed from tool section MB, mold liner ML will remain on formed component FC. See FIGS. 26F and 27F.

According to an exemplary embodiment indicated schematically in FIGS. 21A-21H, 22A-22H, 23A-23H, 28, 29, 30, 31 and 32, tool liner ML may comprise an inert/plastic material (e.g. composition of polyurethane material/liner, silicone, etc.) to facilitate efficient removal of part HMP and/or formed component FC from the mold/tool (e.g. suitable positioning/adherence for the method/process operation with eventual separation of the liner from the formed component); the removable tool liner may be reusable. See also FIGS. 26A-26F and 27A-27F (showing re-use of liner and liner configured to be removed from tool with the formed component).

As indicated schematically according to an exemplary embodiment in FIGS. 9A-9B, 17A-17B and 18A-18B, adhesive AH for heater element HM may comprise a two-sided adhesive tape or carrier/web AC with adhesive AHa (e.g. weaker adhesion from the heater element toward the liner/cover side) and AHb (e.g. stronger/permanent adhesion at the heater element toward the base/substrate side).

According to an exemplary embodiment indicated schematically, the adhesive/tape may comprise a pressure-sensitive adhesive with suitable adhesion for the heater element/mat (e.g. (0.5N/25 mm) without requiring activation; the adhesive/tape may comprise a side with lower adhesion to the mold liner (e.g. (0.5N/25 mm for temporary adhesion during formation process) and with higher adhesion to the body of the heater element/mat (e.g. 25N/25 mm for permanent adhesion within the component). According to an exemplary embodiment indicated schematically, the adhesive/tape may comprise an adhesive material that will not be reactive with the foam material and/or otherwise alter from intended performance in the method/process of production/forming of the formed component.

According to an exemplary embodiment indicated schematically, the adhesive/tape may be of a type commercially available from ATP Adhesive Systems AG of Wollerau, Switzerland as identified as product S4109 (ER/ADA 30/50) (with properties glue area weight 30 g/sqm and 50 g/sqm and peel adhesion force 0.5N/25 mm and 50N/25 mm) (measurement acceptable to Standard AFERA 5001 GTF 6004 (Measurement of Peel Adhesive from Stainless Steel or from its Own Backing ISO 29862-EN 1939).

According to an exemplary embodiment indicated schematically, the adhesive/tape may be an acrylic based/web adhesive (e.g. comprising a thermoplastic glue) to be applied to the heater element/mat and activated by heat (e.g. in a pre-fix tool heated to 50-60 deg C.); the adhesive/tape may be polyurethane based in a web such as a non-woven substrate with open pore structure as to facilitate flow of foam material for integration during formation (e.g. foam can soak through the gaps/pores).

According to an exemplary embodiment indicated schematically, the adhesive/tape may comprise a dry adhesive with a peel-off liner (e.g. factory-pre-dried adhesives applied to a carrier material (film or fabric) and wound onto rolls) configured to develop adhesive force when pressed/rubbed on to the surface to secure the heater element/mat.

According to an exemplary embodiment indicated schematically, the adhesive/tape may be of a type commercially available from UZIN UTZ AG of Ulm, Germany (with product name Sigaway); the adhesive/tape may be activated by pressure/force; the adhesive/tape may be activated by heat. The adhesive/tape (e.g. acrylic co-polymer based adhesive, etc.) may be selected to provide on the tool liner a low adhesion surface (e.g. for temporarily attachment of the heater element during the manufacturing/foaming process).

According to an exemplary embodiment indicated schematically, the adhesive/tape used with the heater element/mat will be selected to facilitate efficient manufacture/assembly (e.g. strong/weak adhesion as selectively desired, facilitating handling for formation/manufacture); the foam material can be selected to facilitate thermal performance of the heater element/mat (e.g. energy efficiency, heat transfer to the surface of the component); the formed component with the heater element/mat may be configured to provide generally even heat transfer/distribution by maintaining the cross-section/depth for the heating wires relative to the surface and foam material.

According to an exemplary embodiment as shown schematically in FIGS. 2, 3A-3C, 4A-4B, 12A-12B, 13, 14A-14B, 15 and 16, a component C or a vehicle interior may comprise a substrate SB, a foam material FM on substrate SB, a heater element HM on foam material FM, and a cover layer over heater element HM. Heater element HM may be attached to substrate SB by an adhesive AH. The component may comprise a composite structure comprising heater element HM and adhesive AH. The component may comprise a composite structure comprising heater element HM and adhesive AH and foam material FM. According to an exemplary embodiment as shown schematically in FIGS. 2, 17A-17B and 18A-18B, adhesive AH may comprise at least one of (a) a pressure-sensitive adhesive; (b) a thermally-activated adhesive; (c) an adhesive web; (d) a dry adhesive; (e) a double-sided adhesive tape; (f) polymer from the group of polyurethanes, acrylics, ethylene-vinyl acetates or their copolymers. As indicated schematically according to an exemplary embodiment in FIGS. 9A-9B, 17A-17B and 18A-18B, adhesive AH for heater element HM may comprise a two-sided adhesive tape or carrier/web AC with adhesive AHa (e.g. for relatively weaker adhesion toward the liner/cover side) and AHb (e.g. for relatively stronger/permanent adhesion toward the base/substrate and/or foam side).

According to an exemplary embodiment as shown schematically in FIGS. 2, 17A-17B and 18A-18B, the adhesive may be intermingled with the foam material; the adhesive may comprise at least two adhesive layers; the adhesive may comprise at least two adhesive layers separated by a carrier; the adhesive may comprise a pressure-sensitive adhesive; the adhesive may comprise an adhesive layer with a plastic film; the adhesive may comprise a thermally-activated adhesive; the thermally-activated adhesive may comprise an adhesive web; the adhesive may comprise an adhesive web; the adhesive web may comprise a polyurethane-based web; the adhesive web may comprise a set of pores; the foam material may be on the adhesive web; the foam material may be within a set of pores in the adhesive web; the foam material may be fused into a set of pores in the adhesive web; the adhesive may comprise a dry adhesive.

According to an exemplary embodiment as shown schematically in FIGS. 2, 17A-17B and 18A-18B, the component may comprise a carrier providing adhesive AH; the carrier may comprise a fabric carrier; the carrier may comprise a non-woven material; the carrier may comprise a plastic material; the carrier may comprise a film carrier; the carrier may comprise a plastic film carrier. According to an exemplary embodiment as shown schematically in FIGS.

14A-14B, cover layer T may comprise at least one of (a) foil; (b) foam foil; (c) leather; (d) artificial leather; (e) TPO; (f) TPE; (g) PVC; (h) TPU; (i) compact foil; (j) bilaminate foil; (k) film layer; (l) foil layer; (m) fabric; (n) spacer fabric. According to an exemplary embodiment as shown schematically in FIGS. 12B, 13, 14B, 15, 17A-17B, 18A-18B, 19 and 20, for the composite structure of the component the wire arrangement HW of the heater element HM may be physically imperceptible; heater element HM may be visually imperceptible; the wire arrangement HW of the heater element HM may be physically imperceptible at cover layer T; heater element HM may be visually imperceptible at cover layer T. As indicated schematically according to an exemplary embodiment in FIGS. 13, 15, 16, 17A-17B, 18A-18B, 19 and 20, within the composite structure for the component C with base/substrate B the foam material FM as formed may provide a leveling/compensation effect for irregularities in the form of the heater element HM so that an even/level position is maintained as well as reduction of the visual/tactile perceptibility of the wire arrangement HW of the heater element at the surface/cover layer T of the component. The component may comprise a glue layer for cover layer T. Heater element HM may comprise a heater mat assembly. The component may comprise an armrest assembly AR.

According to an exemplary embodiment as shown schematically in FIGS. 2, 10A-10G, 11A-11G, 21A-21H, 22A-22H, 23A-23H, 28, 29, 30, 31 and 32, a component C for a vehicle interior may comprise a heater element HM on a substrate SB/B formed by a method comprising the steps of preparing the heater element, placing a liner in the forming tool, placing the heater element on the liner, applying a foam material, and forming the heater element on the substrate. The step of preparing the heater element may comprise the step of applying adhesive to the heater element. The adhesive may comprise at least one of (a) a pressure-sensitive adhesive; (b) a thermally-activated adhesive; (c) an adhesive web; (d) a dry adhesive; (e) a double-sided adhesive tape; (f) polymer from the group of polyurethanes, acrylics, ethylene-vinyl acetates or their copolymers. The step of forming the heater element on the substrate may comprise forming a formed component FC. The step of forming the heater element on the substrate may comprise forming a formed component FC having a shape. The method may comprise the step of removing the formed component FC from the forming tool. The method may comprise the step of applying a glue layer on the heater element of the formed component FC. The method may comprise the step of applying a cover layer T on the glue layer GL of the formed component FC. The component may comprise an armrest assembly AR.

According to an exemplary embodiment as shown schematically in FIGS. 2, 10A-10G, 11A-11G, 21A-21H, 22A-22H, 23A-23H, 28, 29, 30, 31 and 32, a method of producing in a forming tool a component for a vehicle interior comprising a heater element on a substrate may comprise the steps of preparing the heater element, placing a liner in the forming tool, placing the heater element on the liner, applying a foam material, and forming the heater element on the substrate. The step of preparing the heater element may comprise the step of applying adhesive to the heater element. The method may comprise the step of applying adhesive such as a two-sided adhesive/tape to one side of the heater element. The method may comprise the step of removing the component from the forming tool.

According to an exemplary embodiment as shown schematically in FIGS. 2, 10A-10G, 11A-11G, 21A-21H, 22A-22H, 23A-23H, 28, 29, 30, 31 and 32, the step of applying adhesive to the heater element may comprise forming temporary adhesion between the heater element and the liner. The liner may comprise a tool liner configured to facilitate removal of the component from the forming tool. The step of applying adhesive to the heater element may comprise forming temporary adhesion between the heater element and the tool liner so that the tool liner remains in the forming tool when the component is removed from the forming tool. The tool liner may be re-usable. The adhesive may comprise a pressure-sensitive adhesive. The adhesive may comprise an adhesive layer with a plastic film. The adhesive may comprise a thermally-activated adhesive. The thermally-activated adhesive may comprise an adhesive web. The adhesive may comprise an adhesive web. The adhesive web may comprise a polyurethane-based web. The adhesive web may comprise a set of pores. The step of applying a foam material may comprise injecting a foam material on the adhesive web. The foam material may flow into a set of pores in the adhesive web.

According to an exemplary embodiment as shown schematically in FIGS. 2, 10A-10G, 11A-11G, 21A-21H, 22A-22H, 23A-23H, 28, 29, 30, 31 and 32, the adhesive may comprise a dry adhesive. The adhesive may comprise a dry adhesive with a peel-off layer. The adhesive may comprise a carrier with a dry adhesive with a peel-off layer. The method may comprise providing a carrier providing the adhesive. The carrier may comprise a fabric carrier. The carrier may comprise a non-woven material. The carrier may comprise a plastic material. The carrier may comprise a film carrier. The carrier may comprise a plastic film carrier. The carrier may comprise a film carrier with a dry adhesive with peel-off layer. The adhesive may comprise a carrier with dry adhesive applied from a wound roll. The carrier with dry adhesive may comprise a peel-off layer. The step of applying adhesive to the heater element may comprise applying a double-sided adhesive tape. The step of applying adhesive to the heater element may comprise applying adhesive to each side of the heater element. The heater element may comprise a first side and a second side; the step of applying adhesive to the heater element may comprise applying a first adhesive to the first side. The first side of the heater element may be attached by the first adhesive to the liner and the second side of the heater element may be attached without adhesive to the foam material. The first adhesive may comprise a first peel adhesion. The second adhesive for the heater element may comprise a peel adhesion higher than the first peel adhesion. The first peel adhesion may be a lower peel adhesion. The second peel adhesion may be a higher peel adhesion. The first side of the heater element may be attached to the liner and the second side of the heater element may be attached to the foam material. The first adhesive may comprise a tape. The second adhesive for the heater element may comprise at least one of a tape and/or a carrier and/or a pressure-activated adhesive and/or a thermally-activated adhesive.

According to an exemplary embodiment as shown schematically in FIGS. 2, 10A-10G, 11A-11G, 21A-21H, 22A-22H, 23A-23H, 28, 29, 30, 31 and 32, the step of applying a foam material may comprise applying a foam material on the substrate. The step of applying a foam material may comprise applying a foam material on the heater element. The step of applying a foam material may comprise applying a foam material on a carrier for the adhesive. The forming tool may comprise a first second and a second section. The step of placing the liner in the forming tool may comprise placing the liner in the first section of the forming tool. The second section of the forming tool may be configured for the substrate.

According to an exemplary embodiment as shown schematically in FIGS. 2, 10A-10G, 11A-11G, 21A-21H, 22A-22H, 23A-23H, 28, 29, 30, 31 and 32, the substrate may comprise a pre-formed substrate/base. The heater element may comprise a heater mat. The heater element may comprise a heater mat assembly. The heater mat assembly may comprise heater wires on a mat. The heater mat assembly may comprise an electrical connector for the heater wires and a sensor (such as a thermal sensor or other instrumentation/data acquisition device). The heater mat assembly may comprise a removable layer. The removable layer may comprise a peel-away paper. The substrate may comprise a formed substrate providing a shape for the component. The step of forming the heater element on the substrate may comprise forming a formed component with the shape. The step of forming the heater element on the substrate may comprise forming a formed component by closing the forming tool to provide a shape. The step of applying a foam material may comprise injecting a foam material on the heater element. The method may comprise the step of removing the formed component from the forming tool.

According to an exemplary embodiment as shown schematically in FIGS. 2, 10A-10G, 11A-11G, 21A-21H, 22A-22H, 23A-23H, 28, 29, 30, 31 and 32, the liner may comprise a removable liner remaining in the forming tool when the formed element is removed from the forming tool. The removable liner may comprise a chemically inert surface. The removable liner may comprise at least one of a polyethylene material or a silicone material. The liner may comprise a mold liner. The step of forming the heater element on the substrate may comprise forming a formed component. The method may comprise the step of applying a cover layer to the formed component. The step of forming the heater element on the substrate may comprise forming a formed component. The method may comprise the step of removing the formed component from the forming tool; further comprising the step of applying a cover layer to the formed component. The step of forming the heater element on the substrate may comprise forming a formed component. The method may comprise the step of removing the formed component from the forming tool.

According to an exemplary embodiment as shown schematically in FIGS. 2, 13, 14A-14B, 15, 16, 17A-17B, 18A-18B, 20, 23A-23H and 30, the method may comprise providing a cover layer T for the formed component FC to provide a component C; the method may comprise the step of applying a glue layer on the heater element; the method may comprise the step of applying a cover layer on the glue layer of the formed component. The formed component with the cover layer may comprise an armrest assembly with a heater element. The cover layer may comprise at least one of (a) foil; (b) foam foil; (c) leather; (d) artificial leather; (e) TPO; (f) TPE; (g) PVC; (h) TPU; (i) compact foil; (j) bilaminate foil; (k) film layer; (l) foil layer; (m) fabric; (n) spacer fabric. A wire arrangement of the heater element may be physically imperceptible at the cover layer. The heater element may be visually imperceptible at the cover layer. A wire arrangement of the heater element may be physically imperceptible within the component. The heater element may be visually imperceptible within the component. The method may comprise the step of forming the heater element with the substrate into a formed component. The method may comprise the step of forming a formed component comprising the heater element with the substrate. The method may comprise the step of forming a formed component comprising the heater element with the substrate and the foam material. The forming tool may comprise a first section and a second section coupled to the first section by a hinge. The step of forming the formed component may comprise closing the first section onto the second section.

According to an exemplary embodiment as shown schematically in FIGS. 2, 10A-10G, 11A-11G, 21A-21H, 22A-22H, 23A-23H, 28, 29, 30, 31 and 32, a method of producing in a forming tool a component for a vehicle interior comprising a heater element on a substrate may comprise the steps of preparing the heater element, placing the substrate in a first section of the forming tool, placing a liner in a second section of the forming tool, applying a foam material on the liner, forming a formed component of the substrate with liner and foam material, and applying the heater element to the formed component. The step of preparing the heater element may comprise applying adhesive to the heater element. The heater element may comprise a heater mat assembly. The adhesive may comprise at least one of (a) a pressure-sensitive adhesive; (b) a thermally-activated adhesive; (c) an adhesive web; (d) a dry adhesive; (e) a double-sided adhesive tape; (f) polymer from the group of polyurethanes, acrylics, ethylene-vinyl acetates or their copolymers. The method may comprise the step of applying a cover layer to the formed component.

According to an exemplary embodiment as shown schematically in FIGS. 2, 24A-24K and 25A-25L, a method of producing a component for a vehicle interior comprising a heater element on a substrate may comprise the steps of providing a pre-fixing mold, placing the liner in the pre-fixing mold, placing the heater element on the liner in the pre-fixing mold, combining the liner and heater element in the pre-fixing mold, transferring the liner and heater element to a forming mold, applying a foam material to the heater element, forming the heater element on the substrate as a formed component, and removing the formed component from the forming tool. The liner may comprise a removable liner remaining in the forming tool when the formed element is removed from the forming tool. The method may further comprise the step of heating the pre-fixing mold; the step of combining the liner and heater element in the pre-fixing mold may comprise heating the liner and heater element in the pre-fixing mold. The step of combining the liner and heater element in the pre-fixing mold may comprise pressing the liner and heater element in the pre-fixing mold.

According to an exemplary embodiment as shown schematically in FIGS. 2, 24A-24K and 25A-25L, a method of producing a component for a vehicle interior comprising a heater element on a substrate may comprise the steps of heating a pre-fixing mold, placing the liner in the pre-fixing mold, placing the heater element on the liner in the pre-fixing mold, heating the liner and heater element in the pre-fixing mold, transferring the liner and heater element to a forming mold, applying a foam material to the heater element, forming the heater element on the substrate as a formed component, and removing the formed component from the forming tool. The liner may comprise a removable liner remaining in the forming tool when the formed element is removed from the forming tool. The method may comprise the step of preparing the heater element by applying adhesive to the heater element. The method may comprise the step of adhering the heater element towards the liner by heat activation. The method may comprise the step of adhering the heater element towards the liner by heat activation by heating the pre-fixing tool. The method may comprise the step of adhering the heater element towards liner by pressure activation. The method may comprise the step of adhering the heater element towards liner by pressure activation by applying a force to press heater element towards the liner in the pre-fixing tool.

According to an exemplary embodiment as shown schematically in FIGS. 2, 24A-24K and 25A-25L, a method of producing a component for a vehicle interior comprising a heater element on a substrate may comprise the steps of providing a heater element with a liner and an adhesive, heating a pre-fixing mold, placing the heater element with the liner and the adhesive in the pre-fixing mold, heating the heater element with liner and the adhesive in the pre-fixing mold, transferring the heater element with liner and adhesive to a forming mold, applying a foam material, and forming the heater element on the substrate. The heater element may comprise a heater mat. The step of preparing the heater element may comprise the step of applying adhesive to the heater element. The method may comprise the step of preparing the heater element by applying adhesive to the heater element. The step of forming the heater element on the substrate may comprise forming a formed component. The method may comprise the step of removing the formed component from the forming tool. The liner may comprise a removable liner remaining in the forming tool when the formed element is removed from the forming tool. The step of applying a foam material may comprise injecting a form material on the heater element.

Figure 33:
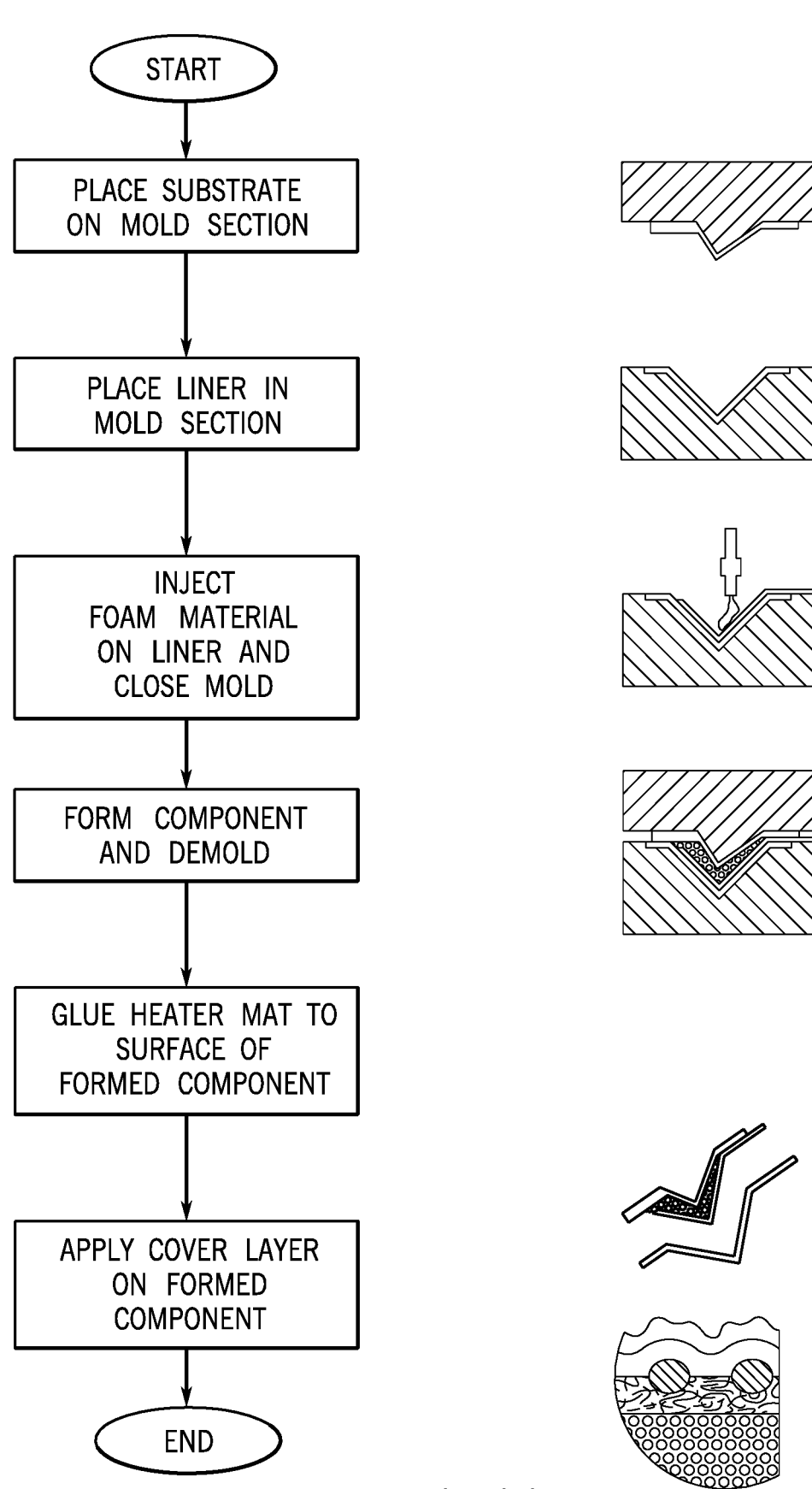
FIG. 33 is a schematic flow diagram of a method for forming a component for a vehicle interior in a generally conventional manner according to an exemplary embodiment.

FIG. 33 is a schematic representation of a generally conventional method/process that is understood to produce a component that may have irregularities in the surface layer and in adhesion/positioning of the heater element (as indicated schematically) that are more readily perceptible at the surface of the component (e.g. for visual/tactile perception); such irregularities are intended not to be present at the cover layer and/or readily perceptible (e.g. visual, tactile etc.) from the wire arrangement of the heater element in a component/formed component produced by a method/process according to the exemplary embodiment shown schematically in FIGS. 2, 12, 14A-14B, 15, 16, 17A-17B, 18A-18B, 19, 20, 28, 29, 30, 31 and 32.

Exemplary Embodiment

According to an exemplary embodiment, a vehicle interior component and a method for manufacturing a vehicle interior component may be provided. The component may comprise a trim component. The component may comprise a cover material, an adhesive layer, a heating layer, a foam and a base. The heating layer may comprise at least one of (a) thin electrical conductive wires; (b) conductive ink; (c) printed conductive ink; (d) a conductive foil. The heating layer may comprise at least one of (a) a sensor/thermal sensor; (b) a carrier layer. The carrier layer may comprise at least one of (a) a non-woven; (b) a fabric; (c) a foil; (d) organic fiber material; (e) inorganic fiber material. The adhesive layer may comprise a carrier layer; the adhesive layer may comprise an adhesive on each side of the carrier layer. The adhesive layer may comprise a double-sided adhesive. The double-sided adhesive may comprise adhesives with different material characteristics. An adhesive on one side of the carrier layer may have lower peel adhesion (e.g. 0.5N/25 mm) and an adhesive on the opposite side of the carrier layer may have higher peel adhesion (e.g. 25N/25 mm).

According to an exemplary embodiment, a method for manufacturing a vehicle interior component may comprise the steps of providing a mold, application of a double-sided adhesive to a carrier layer of a heater mat, application of the heater mat to the mold surface or the mold inlay, application of the heater mat to the mold surface or the mold inlay, and at least one of a foaming process and/or an injection molding process and/or a press lamination process.

The mold may comprise a mold inlay or liner; the mold inlay may be configured to be removable. The mold inlay may be configured to represent the tool surface. The mold inlay may be configured to prevent foam adhesion to the tool surface.

Application of a double-sided adhesive to a carrier layer of a heater mat in which the adhesive may comprise high peel adhesion facing toward the heater mat and a lower peel adhesion facing the mold surface.

The method may be configured to provide a component comprising at least one of (a) surface heating; (b) a smooth and level surface; (c) a surface with deep soft haptics; (d) insulation layers under the heating layer. Additional measures (e.g. padding or grained surfaces above the heating layer) to avoid read through or the feel of heating wire through a thin cover are not required.

| REFERENCE SYMBOL LIST | |
| --- | --- |
| ELEMENT, PART OR COMPONENT | REFERENCE SYMBOL |
| Vehicle | V |
| Interior | I |
| Door panel | DP |
| Component | C |
| Armrest assembly | AR |
| Formed component | FC |
| Heater mat part | HMP |
| Heater element/mat (assembly) | HM |
| Heating wires (of heater mat) | HW |
| Body (carrier) of heater mat | HC |
| Heating mat cover (peel-off cover/paper) | HT |
| Sensor (thermal, heating mat) | SN |
| Wire harness | WH |
| Connector (with socket/plug) | CN |
| Base | B |
| Substrate | SB |
| Foam | FM |
| Cover | T |
| Inner cover layer | TL |
| Adhesive (tape/web) | AH |
| Adhesive (side/layer) | AHa |
| Adhesive (side/layer) | AHb |
| Carrier of adhesive layers | AC |
| Glue | GL |
| Mold/tool | M |
| Mold section/top | MT |
| Mold section/bottom | MB |
| Mold hinge | MG |
| Mold Inlay/Tool Liner | ML |
| Nozzle/outlet (mixing head/foam material) | MH |
| Mold prefix tool | MP |
| Main panel structure/carrier assembly | CR |
| Panel structure (middle-field carrier) | MC |
| Panel section (belt line/ door panel upper) | TH |
| Bezel (pull handle cover) | BP |
| Housing (adapter plate for pull handle) | HP |

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A method of producing in a forming tool comprising a shape a component for a vehicle interior comprising a heater element on a substrate as a formed component comprising the shape comprising the steps of:
   (a) preparing the heater element;
   (b) placing a liner in the forming tool;
   (c) placing the heater element on the liner;
   (d) applying a foam material;
   (e) applying the heater element on the substrate;
   (f) forming the heater element on the substrate as the formed component comprising the shape;
   (g) providing a cover layer for the component;
   wherein the heater element on the substrate is visually imperceptible at the cover layer;
   wherein the step of preparing the heater element comprises the step of applying adhesive to the heater element;

wherein the step of applying adhesive to the heater element comprises forming temporary adhesion between the heater element and the liner;
   wherein the liner comprises a tool liner configured to facilitate removal of the formed component from the forming tool.

2. The method of claim 1 wherein the step of applying adhesive to the heater element comprises forming temporary adhesion between the heater element and the tool liner so that the tool liner remains in the forming tool when the formed component is removed from the forming tool.

3. The method of claim 1 wherein the tool liner is re-usable.

4. The method of claim 1 wherein the adhesive comprises an adhesive web.

5. The method of claim 4 wherein the step of applying a foam material comprises injecting a foam material on the adhesive web; wherein the foam material flows into a set of pores in the adhesive web.

6. The method of claim 1 wherein the heater element comprises a first side and a second side; wherein the step of applying adhesive to the heater element comprises applying a first adhesive to the first side; wherein the first side of the heater element is attached by the first adhesive to the liner and the second side of the heater element is attached without adhesive to the foam material.

7. The method of claim 6 wherein the first adhesive comprises a first peel adhesion.

8. The method of claim 7 wherein a second adhesive for the heater element comprises a peel adhesion higher than the first peel adhesion.

9. The method of claim 1 wherein the forming tool comprises a first section and a second section; wherein the step of placing the liner in the forming tool comprises placing the liner in the first section of the forming tool; wherein the second section of the forming tool is configured for the substrate.

10. The method of claim 1 wherein the substrate comprises a formed substrate providing the shape for the component; wherein the step of applying the heater element on the substrate comprises forming the formed component with the shape.

11. The method of claim 1 wherein the liner comprises a removable liner remaining in the forming tool when the formed element is removed from the forming tool.

12. The method of claim 11 wherein the removable liner comprises a chemically inert surface; wherein the removable liner comprises at least one of a polyethylene material or a silicone material.

13. The method of claim 1 wherein the step of applying the heater element on the substrate comprises forming a formed component; further comprising the step of removing the formed component from the forming tool; further comprising the step of applying a glue layer on the heater element; further comprising the step of applying the cover layer on the glue layer of the formed component.

14. The method of claim 13 wherein the cover layer comprises at least one of (a) foil; (b) foam layer; (c) leather; (d) artificial leather; (e) TPO; (f) TPE; (g) PVC; (h) TPU; (i) compact foil; (j) bilaminate foil; (k) film layer; (l) foil layer; (m) fabric; (n) spacer fabric.

15. The method of claim 1 wherein a wire arrangement of the heater element is physically imperceptible at the cover layer.

16. A method of producing a component for a vehicle interior comprising a heater element on a substrate as a formed component comprising a shape comprising the steps of:

(a) heating a pre-fixing mold;

(b) placing a liner in the pre-fixing mold;

(c) applying adhesive to the heater element and placing the heater element on the liner in the pre-fixing mold;

(d) heating the liner and heater element in the pre-fixing mold;

(e) transferring the liner and heater element to a forming tool comprising the shape;

(f) applying a foam material to the heater element;

(g) forming the heater element on the substrate as the formed component comprising the shape;

(h) removing the formed component from the forming tool;

(i) providing a cover layer for the component;

wherein the heater element on the substrate is visually imperceptible at the cover layer;

wherein the liner comprises a removable liner remaining in the forming tool when the formed element is removed from the forming tool;

wherein the step of applying adhesive to the heater element comprises forming temporary adhesion between the heater element and the liner;

wherein the liner comprises a tool liner configured to facilitate removal of the formed component from the forming tool;

wherein the tool liner is re-usable.

17. The method of claim 16 further comprising the steps of preparing the heater element by applying adhesive to the heater element and adhering the heater element towards the liner by at least one of (a) heat activation; (b) heating the pre-fixing tool; (c) pressure activation; (d) applying a force to press the heater element towards the liner in the pre-fixing mold.

18. A method of producing a component for a vehicle interior comprising a heater element on a substrate as a formed component comprising a shape comprising the steps of:

(a) providing a heater element with a liner and an adhesive;

(b) heating a pre-fixing mold;

(c) preparing the heater element and placing the heater element with the liner and the adhesive in the pre-fixing mold;

(d) heating the heater element with the liner and the adhesive in the pre-fixing mold;

(e) transferring the heater element with the liner and adhesive to a forming tool comprising the shape;

(f) applying a foam material;

(g) forming the heater element on the substrate as the formed component comprising the shape;

(h) providing a cover layer for the component;

wherein the substrate comprises a formed substrate providing a shape for the component;

wherein the step of forming the heater element on the substrate comprises forming the formed component with the shape;

wherein the heater element comprises a heater mat;

wherein the heater element on the substrate is visually imperceptible at the cover layer;

wherein the step of preparing the heater element comprises the step of applying adhesive to the heater element;

wherein the step of applying adhesive to the heater element comprises forming temporary adhesion between the heater element and the liner;

wherein the liner comprises a tool liner configured to facilitate removal of the formed component from the forming tool.

19. The method of claim 18 wherein the tool liner is re-usable.

20. The method of claim 18 wherein a wire arrangement of the heater element is physically imperceptible at the cover layer.

\* \* \* \* \*